United States Patent
Chen et al.

(10) Patent No.: US 10,798,685 B2
(45) Date of Patent: Oct. 6, 2020

(54) CYCLIC REDUNDANCY CHECK FOR UPLINK CONTROL INFORMATION ON CONTROL AND DATA CHANNELS

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 15/164,386

(22) Filed: May 25, 2016

(65) Prior Publication Data

US 2016/0353430 A1 Dec. 1, 2016

Related U.S. Application Data

(60) Provisional application No. 62/167,255, filed on May 27, 2015.

(51) Int. Cl.
*H04L 5/00* (2006.01)
*H04W 72/04* (2009.01)

(52) U.S. Cl.
CPC ......... *H04W 72/0413* (2013.01); *H04L 5/001* (2013.01); *H04L 5/0053* (2013.01);
(Continued)

(58) Field of Classification Search
CPC ..... H04L 5/001; H04L 5/0053; H04L 5/0055; H04L 5/0057; H04Q 2213/13215; H04W 72/0413
See application file for complete search history.

(56) References Cited

U.S. PATENT DOCUMENTS 8,665,813 B2 * 3/2014 Golitschek Edler Von Elbwart ............... H04L 1/0026 370/329
9,391,736 B2 * 7/2016 Nayeb Nazar ........ H04W 24/10
(Continued)

FOREIGN PATENT DOCUMENTS

| CN | 101932116 A | 12/2010 |
|---|---|---|
| CN | 102215085 A | 10/2011 |
| CN | 104348582 A | 2/2015 |

OTHER PUBLICATIONS

ISA/EP, International Search Report and Written Opinion of the International Searching Authority, Int'l App. No. PCT/US2016/034423, dated Aug. 1, 2016, European Patent Office, Rijswijk, NL, 13 pgs.
(Continued)

*Primary Examiner* — Parth Patel
*Assistant Examiner* — Berhanu D Belete
(74) *Attorney, Agent, or Firm* — Holland & Hart LLP

(57) ABSTRACT

Methods, systems, and devices are described for wireless communication. One method includes identifying uplink control information (UCI) for a component carrier (CC) of a carrier aggregation (CA) configuration which may include a primary cell (PCell) and, in some aspects, a physical uplink control channel (PUCCH) enabled secondary cell (SCell); determining to include cyclic redundancy check (CRC) information for the UCI based at least in part on a UCI characteristic or an uplink control channel format; and transmitting an uplink channel comprising the UCI and the CRC information.

25 Claims, 14 Drawing Sheets

(52) U.S. Cl.
CPC .......... *H04L 5/0055* (2013.01); *H04L 5/0057* (2013.01); *H04Q 2213/13215* (2013.01)

(56) References Cited

U.S. PATENT DOCUMENTS

| | | | |
|---|---|---|---|
| 9,490,959 B2* | 11/2016 | Kim | H04L 5/001 |
| 9,722,735 B2* | 8/2017 | Shin | H04L 1/0028 |
| 2010/0008294 A1* | 1/2010 | Palanki | H04W 72/082 |
| | | | 370/328 |
| 2010/0272019 A1* | 10/2010 | Papasakellariou | H04B 7/0417 |
| | | | 370/328 |
| 2011/0141928 A1* | 6/2011 | Shin | H04L 5/0053 |
| | | | 370/252 |
| 2011/0243066 A1* | 10/2011 | Nayeb Nazar | H04L 5/0055 |
| | | | 370/328 |
| 2011/0249578 A1* | 10/2011 | Nayeb Nazar | H04L 1/0027 |
| | | | 370/252 |
| 2011/0310986 A1* | 12/2011 | Heo | H04W 76/27 |
| | | | 375/259 |
| 2012/0113831 A1* | 5/2012 | Pelletier | H04L 5/0053 |
| | | | 370/252 |
| 2013/0083766 A1* | 4/2013 | Chung | H04W 72/0413 |
| | | | 370/329 |
| 2013/0238954 A1* | 9/2013 | Jang | H04L 1/0061 |
| | | | 714/758 |
| 2013/0308558 A1* | 11/2013 | Ye | H04W 72/02 |
| | | | 370/329 |
| 2013/0322398 A1* | 12/2013 | Jang | H04L 1/0026 |
| | | | 370/329 |
| 2014/0016546 A1* | 1/2014 | Jang | H04L 1/0073 |
| | | | 370/328 |
| 2014/0112277 A1* | 4/2014 | Yang | H04L 5/001 |
| | | | 370/329 |
| 2014/0119213 A1* | 5/2014 | Devarasetty | H04L 1/24 |
| | | | 370/252 |
| 2015/0016373 A1* | 1/2015 | Hwang | H04L 1/1671 |
| | | | 370/329 |
| 2015/0036651 A1* | 2/2015 | Takeda | H04W 4/70 |
| | | | 370/330 |
| 2015/0092702 A1* | 4/2015 | Chen | H04L 5/0053 |
| | | | 370/329 |
| 2015/0249998 A1* | 9/2015 | Long | H04W 72/085 |
| | | | 370/329 |
| 2016/0007350 A1* | 1/2016 | Xiong | H04W 24/10 |
| | | | 370/252 |
| 2016/0095048 A1* | 3/2016 | Nory | H04J 11/0093 |
| | | | 370/252 |
| 2016/0174214 A1* | 6/2016 | Yerramalli | H04J 13/0048 |
| | | | 13/48 |
| 2017/0013612 A1* | 1/2017 | Nayeb Nazar | H04L 5/0055 |
| 2017/0048026 A1* | 2/2017 | Park | H04L 1/1864 |
| 2017/0156152 A1* | 6/2017 | Nazar | H04L 1/0027 |
| 2017/0303267 A1* | 10/2017 | Shin | H04L 1/0028 |
| 2017/0318575 A1* | 11/2017 | Park | H04W 72/0413 |
| 2017/0366323 A1* | 12/2017 | Ahn | H04L 5/00 |
| 2018/0302896 A1* | 10/2018 | Nayeb Nazar | H04L 5/0055 |

OTHER PUBLICATIONS

Nokia Networks, "Dynamic Adaptation of HARQ-ACK Feedback Size and PUCCH Format," 3GPP TSG-RAN WG1 Meeting #81, R1-152810, Fukuoka, Japan, May 25-29, 2015, 3 pgs., 3rd Generation Partnership Project.

* cited by examiner

CYCLIC REDUNDANCY CHECK FOR UPLINK CONTROL INFORMATION ON CONTROL AND DATA CHANNELS

CROSS REFERENCES

The present application for patent claims priority to U.S. Provisional Patent Application No. 62/167,255 by Chen, et al., entitled "CRC for Uplink Control Information (UCI) on Control and Data Channels," filed May 27, 2015, assigned to the assignee hereof.

BACKGROUND

The following relates generally to wireless communication, and more specifically to the transmission of a cyclic redundancy check (CRC) for uplink control information (UCI) on control and data channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., Long Term Evolution (LTE) or LTE-Advanced (LTE-A) systems). A wireless multiple-access communications system may include a number of base stations, each simultaneously supporting communication for multiple communication devices, which may be otherwise known as user equipment (UE).

Some modes of communication may enable communications between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Some modes of communication may enable communications between a base station and a UE over multiple component carriers in parallel (e.g., when the base station and the UE operate in a carrier aggregation (CA) mode), or enable communications between multiple base stations and a UE over multiple component carriers in parallel (e.g., when the base stations and the UE operate in a dual-connectivity mode).

In some examples, communications between a base station and a UE over a shared radio frequency spectrum band and/or communications between a base station and a UE over multiple component carriers in parallel, may reduce the reliability of the communications compared to communications between a base station and a UE over a single component carrier in a dedicated radio frequency spectrum band (e.g., a licensed radio frequency spectrum band usable for LTE/LTE-A communications).

SUMMARY

The present disclosure, for example, relates to one or more techniques for transmitting a cyclic redundancy check (CRC) for uplink control information (UCI) on control and data channels. A user equipment (UE) may identify UCI for a component carrier (CC) of a carrier aggregation (CA) configuration which may include a primary cell (PCell). In some aspects, the CA configuration may also include a physical uplink control channel (PUCCH) enabled secondary cell (SCell). The UE may determine to include CRC information for the UCI based on a UCI characteristic or an uplink control channel format. The UE may transmit an uplink channel including the UCI and the CRC information. The UE may determine that the CC includes frequency resources of an unlicensed spectrum, such that the determination to include CRC information for the UCI may be based on the determination that the carrier includes the frequency resources of the unlicensed spectrum. The UE may identify a payload size of the UCI, such that the determination to include the CRC information may be based on the payload size exceeding a threshold. The UE may select a coding scheme for the payload of the UCI, such that the determination to include the CRC information may be based on the coding scheme.

A method of wireless communication is described. The method may include identifying UCI for a CC of a CA configuration, determining to include CRC information for the UCI based at least in part on a UCI characteristic or an uplink control channel format, and transmitting an uplink channel including the UCI and the CRC information.

An apparatus for wireless communication is described. The apparatus may include means for identifying UCI for a CC of a CA configuration, means for determining to include CRC information for the UCI based at least in part on a UCI characteristic or an uplink control channel format, and means for transmitting an uplink channel including the UCI and the CRC information.

A further apparatus for wireless communication is described. The apparatus may include a processor, memory in electronic communication with the processor, and instructions stored in the memory and operable, when executed by the processor, to cause the apparatus to identify UCI for a CC of a CA configuration, determine to include CRC information for the UCI based at least in part on a UCI characteristic or an uplink control channel format, and transmit an uplink channel including the UCI and the CRC information.

A computer program product including a non-transitory computer-readable medium, is described. The non-transitory computer-readable medium may include instructions to identify UCI for a CC of a CA configuration, instructions to determine to include CRC information for the UCI based at least in part on a UCI characteristic or an uplink control channel format, and instructions to transmit an uplink channel including the UCI and the CRC information.

Some examples of the method, apparatuses, or non-transitory computer-readable medium described herein may further include processes, features, means, or instructions for determining that the CC includes frequency resources of unlicensed spectrum, wherein the determination to include CRC information for the UCI is based at least in part on the determination that the carrier includes the frequency resources of the unlicensed spectrum. Additionally or alternatively, in some examples the UCI characteristic may include a payload size of the UCI. Additionally or alternatively, in some examples the CA configuration may include a PCell and, in some examples, a PUCCH enabled SCell. Additionally or alternatively, determining to include CRC information may be performed separately for at least a first group and a second group, wherein the first group comprises the PCell and the second group comprises the PUCCH enabled SCell.

Some examples of the method, apparatuses, or non-transitory computer-readable medium described herein may further include processes, features, means, or instructions for identifying a payload size of the UCI, wherein the determination to include the CRC information is based at least in part on the payload size exceeding a threshold. Additionally or alternatively, in some examples the threshold is based at least in part on whether the uplink channel includes a PUCCH or a physical uplink shared channel (PUSCH).

In some examples of the method, apparatuses, or non-transitory computer-readable medium described herein, the payload size of the UCI is identified based at least in part on at least one of a radio resource control (RRC) configuration, dynamic signaling, or a number of transport blocks, or any combination thereof. Additionally or alternatively, some examples may include processes, features, means, or instructions for selecting a coding scheme for the payload of the UCI, wherein the determination to include the CRC information is associated with the coding scheme.

In some examples of the method, apparatuses, or non-transitory computer-readable medium described herein, identifying UCI for the CC of the CA configuration may include identifying UCI for a plurality of CCs of the CA configuration, wherein the determination to include CRC information is based at least in part on quantity in the plurality. Additionally or alternatively, in some examples the UCI characteristic may include a UCI type.

In some examples of the method, apparatuses, or non-transitory computer-readable medium described herein, the UCI may include a plurality of UCI types, and the determination to include CRC information may include determining whether to include CRC information separately for one or more UCI types of the plurality. Additionally or alternatively, in some examples the plurality of UCI types may include at least one of an acknowledgement (ACK), a negative acknowledgement (NAK), a channel quality indicator (CQI), a precoding matrix indicator (PMI), a rank indicator (RI), a procedure transaction identifier (PTI), a scheduling request (SR), or any combination thereof.

In some examples of the method, apparatuses, or non-transitory computer-readable medium described herein, the CRC information may include a number bits that is based at least in part on a UCI type. Additionally or alternatively, in some examples the uplink channel may include a PUCCH on the PCell.

In some examples of the method, apparatuses, or non-transitory computer-readable medium described herein, the uplink channel may include a PUCCH on a PUCCH enabled SCell. Additionally or alternatively, in some examples the uplink channel may include a physical uplink shared channel (PUSCH). Additionally or alternatively, in some examples the CA configuration may include more than five CCs.

BRIEF DESCRIPTION OF THE DRAWINGS

Aspects of the disclosure are described in reference to the following figures.

DETAILED DESCRIPTION

Methods, systems, and devices are described for wireless communication. The methods, systems, and devices may increase the reliability of transmitting uplink control information (UCI) on control and data channels by using a cyclic redundancy check (CRC) for a user equipment (UE) under at least some conditions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
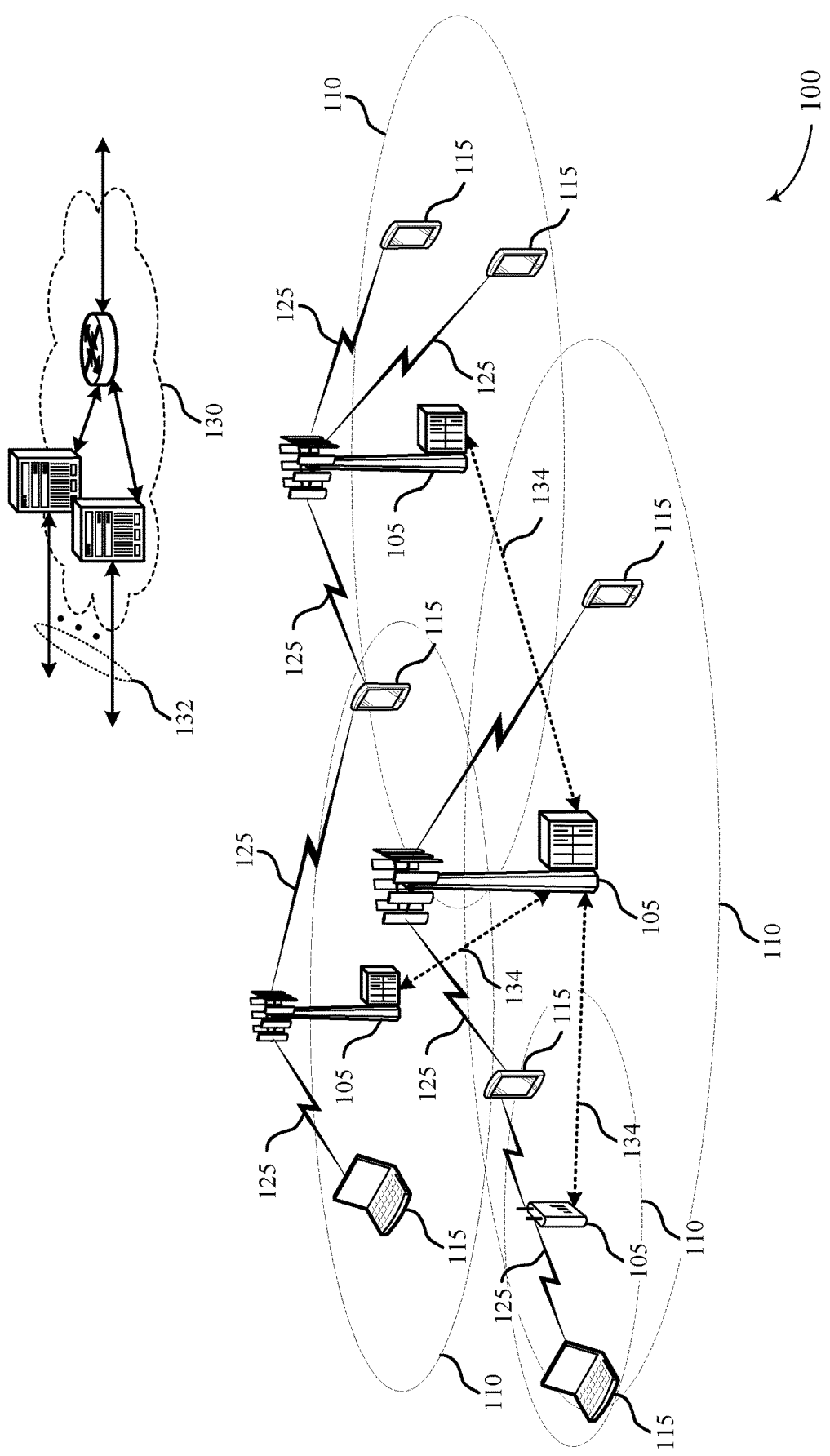
FIG. 1 illustrates an example of a wireless communications system that supports transmission of cyclic redundancy check (CRC) for uplink control information (UCI) on control and data channels in accordance with various aspects of the present disclosure.

FIG. 1 illustrates an example of a wireless communication system 100 that supports transmission of CRC for UCI on control and data channels, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include a Long Term Evolution (LTE)/LTE Advanced (LTE-A) network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a "3rd Generation Partnership Project" (3GPP) term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements (ACKs) or non-acknowledgements (ACKs) of downlink transmissions, scheduling requests (SRs) or enhanced SRs (eSRs), or channel state information (CSI). UL transmissions may also include transmissions of data, which data may be transmitted over a physical uplink shared channel (PUSCH) or enhanced PUSCH (ePUSCH). References in this disclosure to a PUCCH, a PUSCH, or an SR are presumed to inherently include references to a respective ePUCCH, ePUSCH, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC.

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band (e.g., licensed spectrum) usable for LTE/LTE-A communications) or a shared radio frequency spectrum band (e.g., a radio frequency spectrum band for which transmitting apparatuses may need to contend for access (e.g., a radio frequency spectrum band (e.g., unlicensed spectrum) that is available for unlicensed use, such as Wi-Fi use, or a radio frequency spectrum band that is available for use by multiple operators in an equally shared or prioritized manner)). The dedicated radio frequency spectrum band or shared radio frequency spectrum band may be used for LTE/LTE-A communications.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, transmitting apparatuses may perform a listen before talk (LBT) procedure to gain access to the shared radio frequency spectrum band. Such an LBT procedure may include performing a clear channel assessment (CCA) procedure (or an extended CCA procedure) to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. The channel reservation signal may reserve the shared radio frequency spectrum by providing a detectable energy on the shared radio frequency spectrum band. The channel reservation signal may also serve to identify the transmitting apparatus or synchronize the transmitting apparatus and a receiving apparatus. When it is determined that a channel is not available, a CCA procedure (or extended CCA procedure) may be performed for the channel again at a later time.

After a UE 115 wins contention for access to a shared radio frequency spectrum band, the UE 115 may communicate with a base station 105 on an uplink. In some examples, the UE 115 may communicate on the uplink in an uplink carrier aggregation mode or a dual-connectivity mode. When the UE 115 is also communicating with the base station 105 using at least one UL CC in a dedicated radio frequency spectrum band and at least one UL CC in the shared radio frequency spectrum band, the UE 115 may have to select a UL CC in the dedicated radio frequency spectrum band and/or a UL CC in the shared radio frequency spectrum band for transmitting UCI. In some scenarios, a UL CC in the dedicated radio frequency spectrum band may be more reliable than a UL CC in the shared radio frequency spectrum band, and it may be useful to configure or bias the UE to select a UL CC in the dedicated radio frequency spectrum band for transmitting UCI (e.g., one or more of an SR, an ACK/non-acknowledgement (NAK), periodic channel state information (CSI), or aperiodic CSI).

Figure 2:
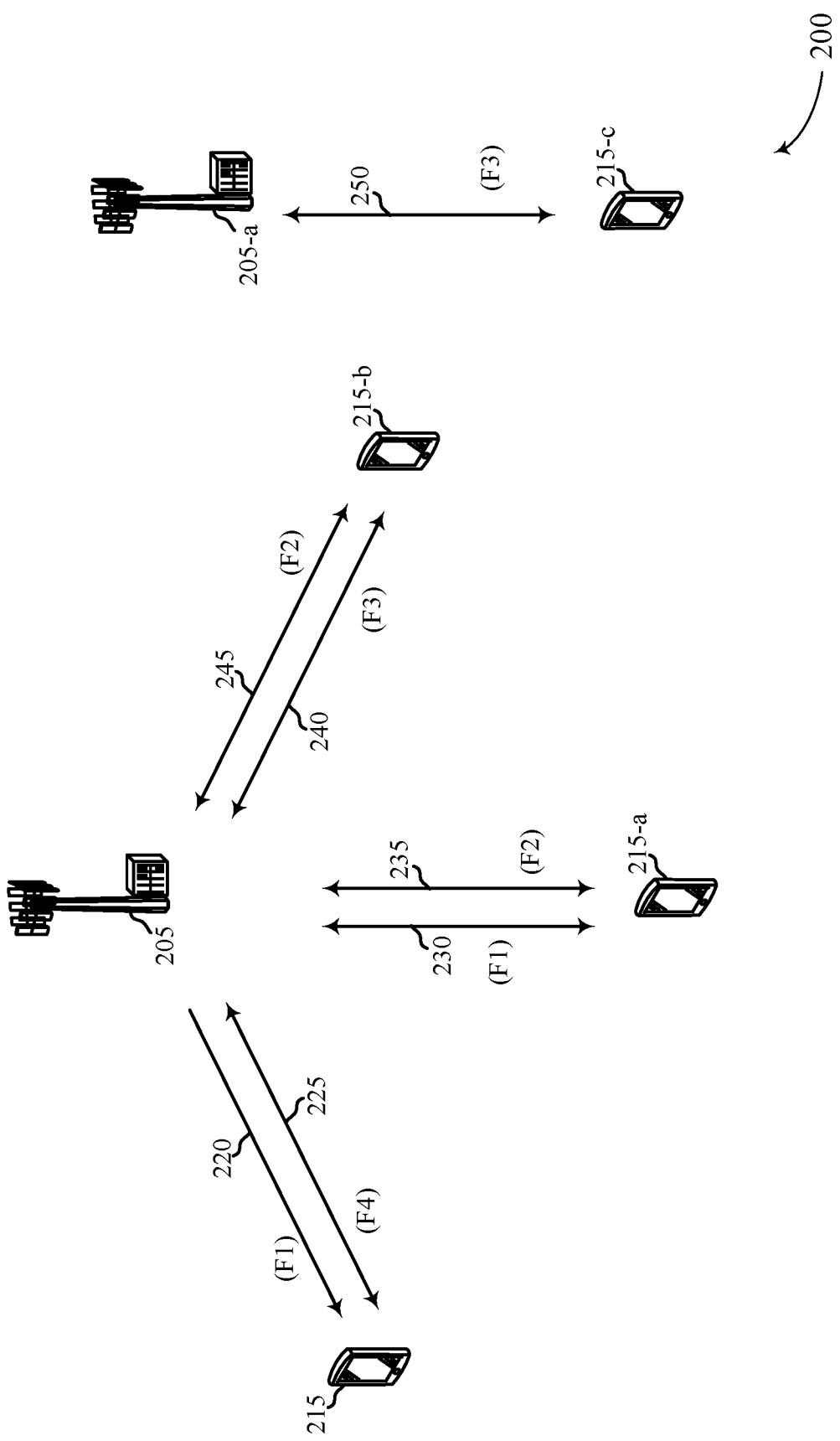
FIG. 2 illustrates an example of a wireless communication system in which Long Term Evolution (LTE)/LTE Advanced (LTE-A) may be deployed under different scenarios using a dedicated radio frequency spectrum band or a shared radio frequency spectrum band in accordance with various aspects of the present disclosure.

FIG. 2 shows a wireless communication system 200 in which LTE/LTE-A may be deployed under different scenarios using a dedicated radio frequency spectrum band or a shared radio frequency spectrum band, in accordance with various aspects of the present disclosure. More specifically, FIG. 2 illustrates examples of a supplemental downlink mode (also referred to as a shared downlink mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC, or PCell) on the dedicated radio frequency spectrum band and at least one secondary component carrier (SCC, or SCell) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
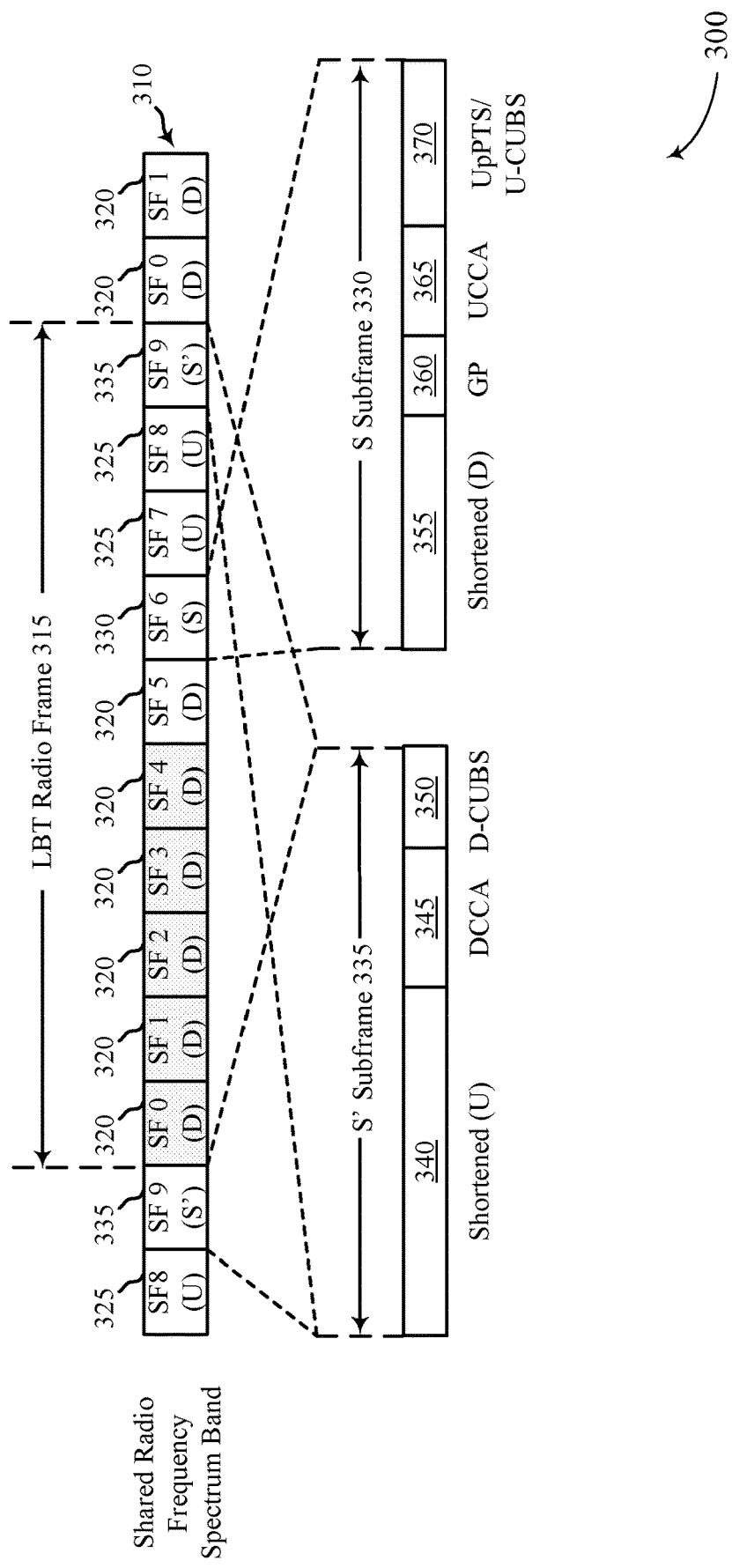
FIG. 3 illustrates an example of a wireless communication over a shared radio frequency spectrum band in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include a transmission of one or more uplink component carriers, which uplink component carrier(s) may be transmitted, for example, as part of a transmission made according to the supplemental downlink mode, the carrier aggregation mode, or the standalone mode described with reference to FIG. 2, the carrier aggregation mode described with reference to FIG. 5, and/or the dual-connectivity mode described with referenced to FIG. 6.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A common reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures.

Figure 4:
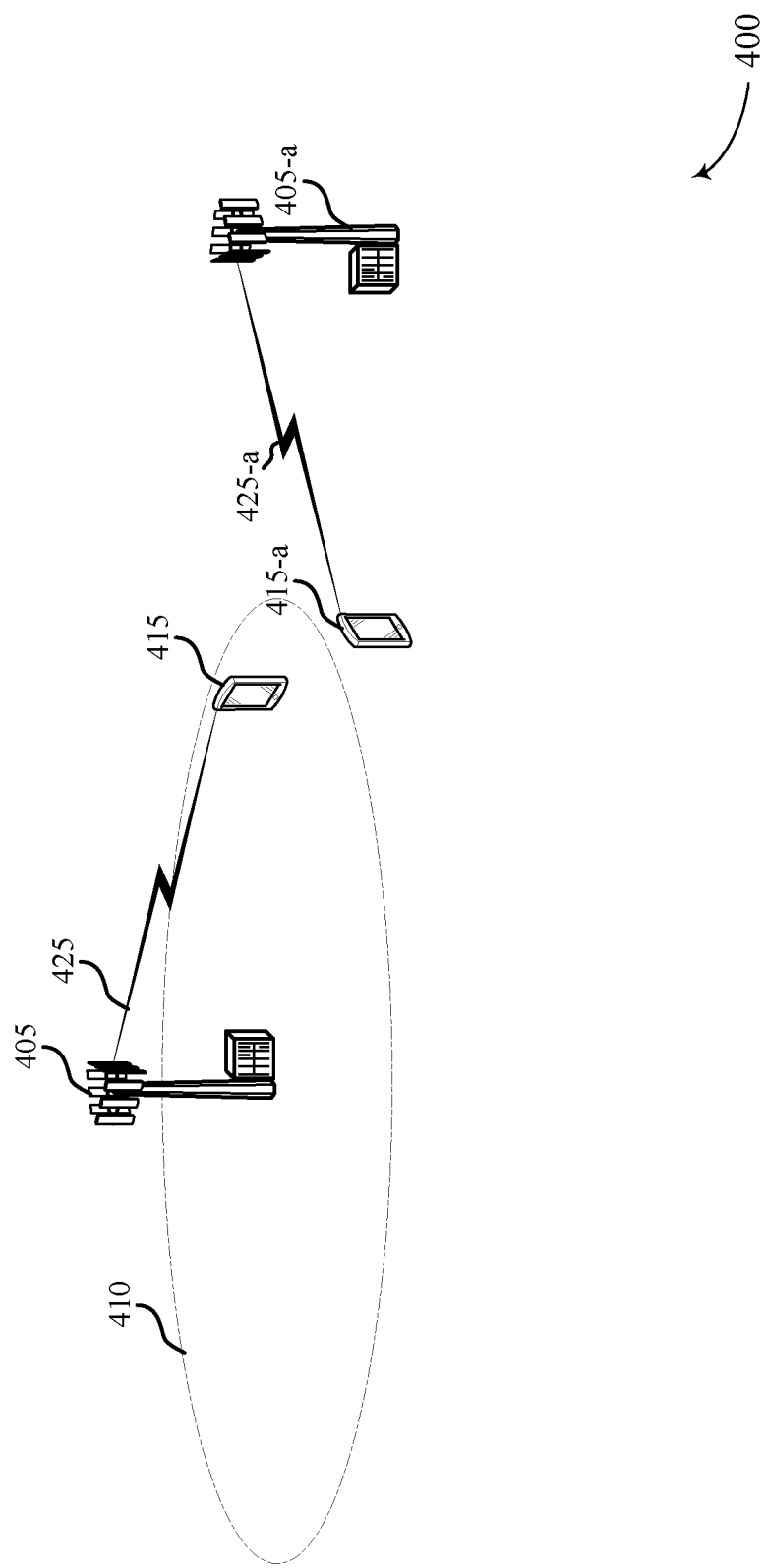
FIG. 4 illustrates an example of a wireless communication system in which LTE/LTE-A may be deployed under different scenarios using a dedicated radio frequency spectrum band or a shared radio frequency spectrum band in accordance with various aspects of the present disclosure.

FIG. 4 shows a wireless communication system 400 in which LTE/LTE-A may be deployed under different scenarios using a dedicated radio frequency spectrum band or a shared radio frequency spectrum band, in accordance with various aspects of the present disclosure. The wireless communication system 400 may be an example of portions of the wireless communication system 100 or 200 described with reference to FIG. 1 or 2. Moreover, a first base station 405 and a second base station 405-a may be examples of aspects of one or more of the base stations 105, 205, or 205-a described with reference to FIG. 1 or 2, while a first UE 415 and a second UE 415-a may be examples of aspects of one or more of the UEs 115, 215, 215-a, 215-b, or 215-c described with reference to FIG. 1 or 2.

In the wireless communication system 400, the base station 405 may win contention for access to a shared radio frequency spectrum band and begin communicating with the UE 415 via communication link 425. However, communications with the UE may experience interference as a result of the UE 415-a communicating with the base station 405-a. When the base station 405 contends for access to the shared radio frequency spectrum band (e.g., performs a DCCA procedure) while the base station 405-a is communicating with the UE 415-a on downlink, the base station 405 may not detect the energy of the communications on the shared radio frequency spectrum band because the base station 405-a operates outside the coverage area 410 of the base station 405. Similarly, if the UE 415-a contends for access to the shared radio frequency spectrum band (e.g., performs a UCCA procedure) while the base station 405 is communicating with the UE 415 on downlink, the UE 415-a may not detect the energy of the communications on the shared radio frequency spectrum band because the base station 405 operates outside the coverage area of the UE 415-a. The UE 415 may also contend for access to the shared radio frequency spectrum band (e.g., perform a UCCA procedure) while the base station 405-a is communicating with the UE 415-a on downlink, and thus not detect the energy of the communications on the shared radio frequency spectrum band because the base station 405-a operates outside the coverage area of the UE 415. Scenarios may therefore arise when communications over the communication link 425 experience hidden node interference (i.e., interference from nodes, such as the UE 415-a, that are able to gain access to the shared radio frequency spectrum band at the same time as the base station 405 or 415. The UE 415-a, which may operate as a hidden node to the base station 405, may also prevent the UE 415 performing a successful UCCA, and thereby prevent the UE 415 from communicating with the base station 405 over an uplink (e.g., to transmit UCI to the base station 405).

Figure 5:
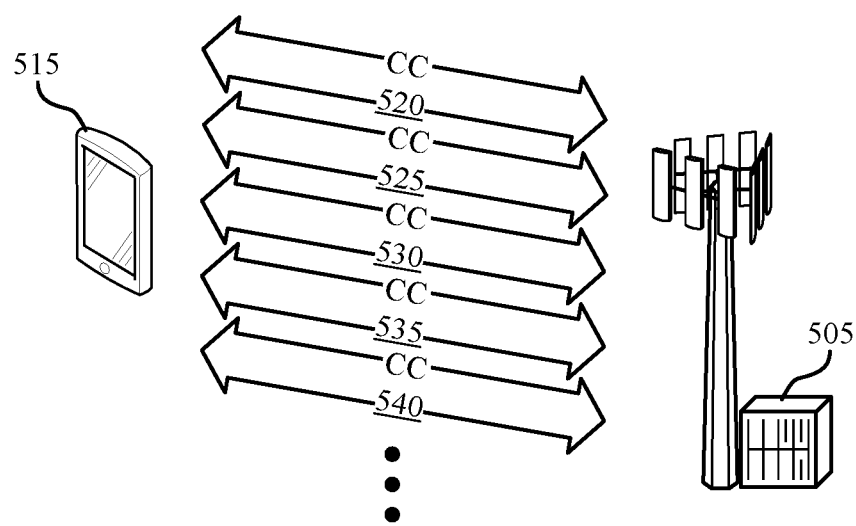
FIG. 5 illustrates a wireless communication system in which LTE/LTE-A may be deployed in a carrier aggregation scenario in accordance with various aspects of the present disclosure.

FIG. 5 shows a wireless communication system 500 in which LTE/LTE-A may be deployed in a carrier aggregation scenario, in accordance with various aspects of the present disclosure. The wireless communication system 500 may be an example of portions of the wireless communication system 100, 200, or 400 described with reference to FIG. 1, 2, or 4. Moreover, a base station 505 may be an example of aspects of one or more of the base stations 105, 205, 205-a, 405, or 405-a described with reference to FIG. 1, 2, or 4, while a UE 515 may be an examples of aspects of one or more of the UEs 115, 215, 215-a, 215-b, 215-c, 415, or 415-a described with reference to FIG. 1, 2, or 4.

When communicating in a carrier aggregation mode using LTE/LTE-A communications, the UE 515 may communicate with the base station 505 using up to five component carriers (CCs). Each of the CCs may have a bandwidth of up to 20 MHz (e.g., the UE 515 may component with the base station 505 over a 100 MHz bandwidth). The CCs may all operate in an FDD mode, all operate in a TDD mode, or operate in a mixture of FDD and TDD modes. Different CCs may have the same or different DL/UL configurations (and special subframes may be configured differently for different TDD CCs). When communicating in an enhanced carrier aggregation (eCA) mode, the UE 515 may communicate with the base station 505 using up to 32 CCs. One of the CCs may be designated as a primary CC, and the remaining CCs may be designated as secondary CCs. In some examples, the primary CC may carry a PUCCH and common search space for the UE 515. In other examples, the primary CC and one or more secondary CCs may each carry a PUCCH (e.g., for load balancing). In some cases, each PUCCH may carry UCI. Each CC may be configured as a DL CC, a UL CC, or a cell (e.g., a CC that may be configured for use as a DL CC and/or a UL CC). By way of example, FIG. 5 illustrates communication between the UE 515 and the base station 505 over five CCs, including a first CC 520, a second CC 525, a third CC 530, a fourth CC 535, and a fifth CC 540. Each of the first CC 520, the second CC 525, the third CC 530, the fourth CC 535, and the fifth CC 540 may operate in a dedicated radio frequency spectrum band or a shared radio frequency spectrum band, depending on how the CC is allocated or configured.

When the UE 515 is configured for operation in a supplemental downlink mode of operation using a shared radio frequency spectrum band, as described with reference to FIG. 2, and when the UE 515 is operating in a carrier aggregation mode, one or more of the first CC 520, the second CC 525, the third CC 530, the fourth CC 535, or the fifth CC 540 may operate as a UL CC or a DL CC in the dedicated radio frequency spectrum band, and one or more of the first CC 520, the second CC 525, the third CC 530, the fourth CC 535, or the fifth CC 540 may operate as a DL CC in the shared radio frequency spectrum band.

When the UE 515 is configured for operation in a carrier aggregation mode of operation using the shared radio frequency spectrum band, as described with reference to FIG. 2, one or more of the first CC 520, the second CC 525, the third CC 530, the fourth CC 535, or the fifth CC 540 may operate as a UL CC or a DL CC in the dedicated radio frequency spectrum band, and one or more of the first CC 520, the second CC 525, the third CC 530, the fourth CC 535, or the fifth CC 540 may operate as a DL CC or a UL CC in the shared radio frequency spectrum band. In some examples, all of the DL CCs may operate in the dedicated radio frequency spectrum band, or all of the UL CCs may operate in the shared radio frequency spectrum band, but not all of the DL CCs and all of the UL CCs may operate in the shared radio frequency spectrum band (e.g., at least one DL CC or at least UL CC operates in the dedicated radio frequency spectrum band).

When the UE 515 is configured for operation in a stand-alone mode of operation using the shared radio frequency spectrum band, as described with reference to FIG. 2, and when the UE 515 is operating in a carrier aggregation mode, each of the first CC 520, the second CC 525, the third CC 530, the fourth CC 535, and the fifth CC 540 may operate in the shared radio frequency spectrum band.

Figure 6:
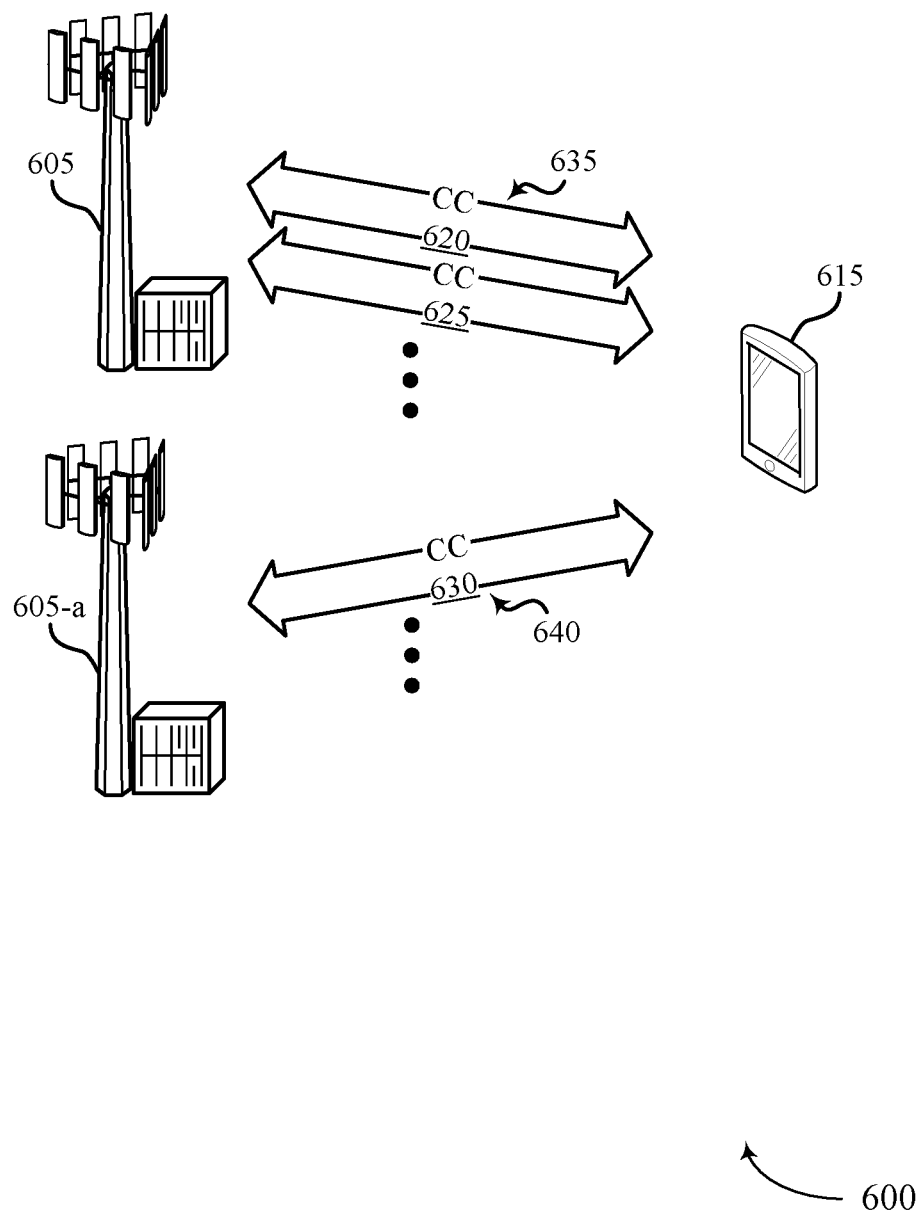
FIG. 6 illustrates a wireless communication system in which LTE/LTE-A may be deployed in a dual-connectivity scenario (e.g., a coordinated multipoint (CoMP) scenario) in accordance with various aspects of the present disclosure.

FIG. 6 shows a wireless communication system 600 in which LTE/LTE-A may be deployed in a dual-connectivity scenario (e.g., a coordinated multipoint (CoMP) scenario), in accordance with various aspects of the present disclosure. The wireless communication system 600 may be an example of portions of the wireless communication system 100, 200, 400, or 500 described with reference to FIG. 1, 2, 4, or 5. Moreover, a first base station 605 and a second base station 605-a may be examples of aspects of one or more of the base stations 105, 205, 205-a, 405, 405-a, or 505 described with reference to FIG. 1, 2, 4, or 5, while a UE 615 may be an examples of aspects of one or more of the UEs 115, 215, 215-a, 215-b, 215-c, 415, 415-a, or 515 described with reference to FIG. 1, 2, 4, or 5. The first base station 605 and the second base station 605-a may or may not be connected by an ideal backhaul. When the first base station 605 and the second base station 605-a are not connected by an ideal backhaul, there may be loose coordination between the base stations (e.g., as a result of limited backhaul capacity or non-negligible backhaul latency (e.g., tens of milliseconds)).

When communicating in a dual-connectivity mode using LTE/LTE-A communications, the UE 615 may communicate with multiple base stations, such as the first base station 605 and the second base station 605-a, using, for example, five or more CCs. One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 5 illustrates communication between the UE 615 and the base station 605 over three CCs, including a first CC 620, a second CC 625, and a third CC 630. In some examples, the first CC 620 and the second CC 625 (in communication with the first base station 605) may be configured as a primary group of CCs 635 in a dual-connectivity operation, and the third CC 630 (in communication with the second base station 505-a) may be configured as a secondary group of CCs 640 in the dual-connectivity operation. The first CC 620, the second CC 625, and the third CC 630 may be configured for various modes of operation using a dedicated radio frequency spectrum band or a shared radio frequency spectrum band, similarly to how component carriers may be used in a carrier aggregation mode of operation, as described, for example, with reference to FIG. 5.

In some examples, a first PUCCH may be carried by a CC in the primary group of CCs 635 and a second PUCCH may be carried by a CC in the secondary group of CCs 640, such that UCI may be separately conveyed to each of the primary group of CCs 635 and the secondary group of CCs 640. In some examples, a PUCCH may be carried by each of the CCs in each of the primary group of CCs 635 and the secondary group of CCs 640, and in some examples, each PUCCH may carry UCI. The UE 615 may also monitor a common search space of the primary group of CCs 635 and a common search space of the secondary group of CCs 640. Semi-persistent scheduling (SPS) and scheduling request (SR) transmission may also be supported by each of the primary group of CCs 635 and the secondary group of CCs 640.

Various types of UCI, including ACK/NAK information, an SR, or CSI may be transmitted on a UL CC. In some examples, the various types of UCI may have different performance targets (or requirements). For example, ACK/

NAK information may have the highest performance target (e.g., NAK to ACK error rate may be on the order of $10^{-3}$ or less), SR may have a next highest performance target, and a performance target higher than that of CSI; and CSI may be able to tolerate reasonable performance degradation (e.g., CSI may be associated with a 4% bit error rate (BER) performance target). In general, transmission of UCI over a shared radio frequency spectrum band is less reliable than transmission of UCI over a dedicated radio frequency spectrum band, because of the potential for hidden node interference, as described with reference to FIG. 4.

When UCI is transmitted on a PUSCH (i.e., piggybacked on a PUSCH), it can be difficult to ensure UCI performance targets are met while also maintaining efficient UL operation. To help ensure that UCI performance targets are met, the amount of resources allocated for UCI on a PUSCH may be allocated conservatively. In part because of the conservative allocation of resources for UCI on a PUSCH, ACK/NAK information transmitted on a PUSCH is currently not protected by a CRC. ACK/NAK information transmitted on a PUCCH is also not currently protected by a CRC. However, when a PUCCH is associated with an eCA mode of operation (e.g., associated with up to 32 CCs), or when a PUCCH is associated with a CC transmitted in a shared radio frequency spectrum band, the protection of ACK/NAK information by a CRC may be useful. The protection of ACK/NAK information by a CRC can enable better NAK to ACK error management (e.g., the protection of ACK/NAK information by a 16-bit CRC may reduce the NAK to ACK error from approximately $10^{-3}$ to $10^{-5}$).

When ACK/NAK information is carried on a PUCCH, protection of the ACK/NAK information by a CRC may be conditioned on various factors. For example, the decision to protect ACK/NAK information by a CRC may be based on the PUCCH format on which the ACK/NAK information is transmitted (e.g., ACK/NAK information transmitted on PUCCH format 3 may not be protected by a CRC, but ACK/NAK information transmitted on PUCCH format 4 may be protected by a CRC). As another example, the decision to protect ACK/NAK information by a CRC may be based on a payload size. The decision to protect ACK/NAK information by a CRC may also be based on a payload size in combination with the PUCCH format on which the ACK/NAK information is transmitted. For example, ACK/NAK information transmitted on PUCCH format 3 may not be protected by a CRC, but ACK/NAK information transmitted on PUCCH format 4 may or may not be protected by a CRC, depending on the payload size (e.g., when the payload size≥a payload size threshold, ACK/NAK information transmitted on PUCCH format 4 may be protected by a CRC, and when the payload size<the payload size threshold, ACK/NAK information transmitted on PUCCH format 4 may not be protected by a CRC). By way of example, the payload size threshold may be 10 bits.

The payload size used to determine whether ACK/NAK information should be protected by a CRC may be based, for example, on any combination of ACK/NAK, SR, and CSI information transmitted on a PUCCH (e.g., regardless of UCI type). Alternatively, the payload size may be UCI type dependent. In the latter case, and by way of example, the decision to protect ACK/NAK information by a CRC may be based on different rules for different UCI types. For example, when ACK/NAK/SR information and CSI information is jointly coded, the transmission of ACK/NAK information on PUCCH format 4 may be protected by a CRC when an ACK/NAK/SR payload size≥a first payload size threshold, and the transmission of ACK/NAK information on PUCCH format 4 may not be protected by a CRC when the ACK/NAK/SR payload size<the first payload size threshold. In some examples, the first payload size threshold may be 0 bits. When ACK/NAK/SR information and CSI information is separately encoded, the transmission of ACK/NAK information on PUCCH format 4 may be protected by a CRC when an ACK/NAK/SR payload size≥a second payload size threshold, and the transmission of ACK/NAK information on PUCCH format 4 may not be protected by a CRC when the ACK/NAK/SR payload size<the second payload size threshold. In some examples, the second payload size threshold may be 10 bits.

As another example, the decision to protect ACK/NAK information by a CRC may be based on a cell type. For example, when a PUCCH carrying the ACK/NAK information is transmitted on a cell in a shared radio frequency spectrum band, the ACK/NAK information (or UCI) may be protected by a CRC, but when a PUCCH carrying the ACK/NAK information is transmitted on a cell in a dedicated radio frequency spectrum band, the ACK/NAK information (or UCI) may not be protected by a CRC (or may be protected by a CRC under some conditions, such as the use of a certain PUCCH format or the existence of a payload size that satisfies a payload size threshold).

In some cases, LTE/LTE-A standards indicate (or suggest) that UCI should be transmitted on a cell in a shared radio frequency spectrum band. For example, when aperiodic CSI is triggered in a UL grant for a cell, LTE/LTE-A standards indicate that a PUSCH transmitted on the cell should carry all of the UCI in a subframe. However, when the cell is in the shared radio frequency spectrum band, the PUSCH transmitted on the cell may be subject to hidden node interference, as described with reference to FIG. 4. Transmission of the PUSCH, including the UCI, may therefore be less reliable than transmission of a PUSCH (and UCI) on a cell in a dedicated radio frequency spectrum band. One way to address the questionable reliability of the transmitting UCI in the shared radio frequency spectrum band is to transmit all UCI on a cell in the dedicated radio frequency spectrum band (e.g., even when aperiodic CSI is triggered on a cell in the shared radio frequency spectrum band). Alternatively, CSI may be transmitted on the PUSCH on the cell in the shared radio frequency spectrum band, and ACK/NAK/SR or other information may be transmitted (e.g., piggybacked) on the cell in the dedicated radio frequency spectrum band.

When ACK/NAK information is transmitted during operation in an eCA mode, the ACK/NAK information may be carried on a PUCCH, as previously described, or on a PUSCH (e.g., as previously described).

Although ACK/NAK/SR information and CSI information may be jointly coded or separately coded when transmitted on a PUCCH, ACK/NAK information, CQI/PMI information, and RI/payload transaction identifier (PTI) information are separately coded and mapped on a PUSCH. When ACK/NAK information, CQI/PMI information, and RI/PTI information are transmitted on a PUSCH, and are separately coded, separate decisions may be made to protect the ACK/NAK information, CQI/PMI information, and RI/PTI information by a CRC. For example, the decision to protect the ACK/NAK information by a CRC may be based at least in part on a determined ACK/NAK payload size (e.g., similarly to the described decision process for protecting ACK/NAK information transmitted on a PUCCH by a CRC). The same or different payload size thresholds may be used for deciding whether to protect ACK/NAK information transmitted on a PUCCH and deciding whether to protect ACK/NAK information transmitted on a PUSCH. Different payload size thresholds may be useful when UCI transmitted on the PUCCH is jointly coded for different UCI types (and when UCI transmitted on the PUSCH is separately coded). In some examples, an ACK/NAK payload size may be determined based at least in part on a RRC configuration, a dynamic indication, a detected number of transport blocks, or a combination thereof. In some examples, the CRC used to protect ACK/NAK information transmitted on a PUSCH may have a length of 16 bits.

In some examples, the decision to protect CQI/PMI information by a CRC, when transmitted on a PUSCH, may be based on a CQI/PMI payload size. For example, when the CQI/PMI payload size is greater than 11 bits, the CQI/PMI information may be protected by a CRC, and when the CQI/PMI payload size is less than or equal to 11 bits, the CQI/PMI information may not be protected by a CRC. In some examples, the CRC used to protect CQI/PMI information transmitted on a PUSCH may have a length of 8 bits.

In some examples, the decision to protect RI/PTI information by a CRC, when transmitted on a PUCCH, may be based on an RI/PTI payload size or a number of CCs for which RI/PTI information is reported. For example, when the RI/PTI payload size is greater than 11 bits, the RI/PTI information may be protected by a CRC, and when the RI/PTI payload size is less than or equal to 11 bits, the RI/PTI information may not be protected by a CRC. Alternatively, when RI/PTI information is reported for two or more CCs, the RI/PTI information may be protected by a CRC, and when the RI/PTI information is reported for one CC, the RI/PTI information may not be protected by a CRC. In some examples, the CRC used to protect RI/PTI information transmitted on a PUSCH may have a length of 8 bits.

Figure 7:
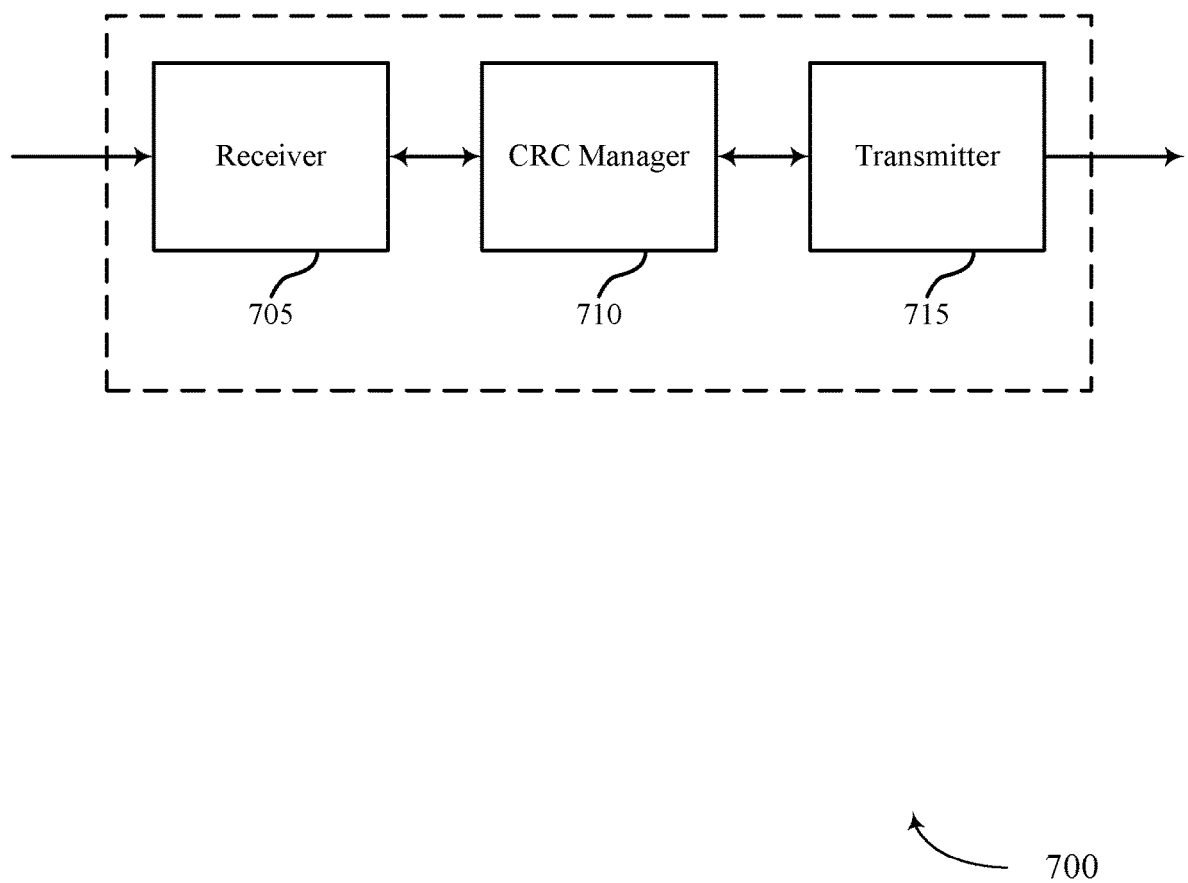
FIGS. 7-9 show block diagrams of a wireless device that supports transmission of CRC for UCI on control and data channels in accordance with various aspects of the present disclosure.

FIG. 7 shows a block diagram of a wireless device 700 configured to transmit a CRC for UCI on control and data channels in accordance with various aspects of the present disclosure. Wireless device 700 may be an example of aspects of a UE 115, 215, 215-a, 215-b, 215-c, 415, 415-a, 515, or 615 described with reference to FIG. 1, 2, 4, 5, or 6. Wireless device 700 may include a receiver 705, a CRC manager 710, or a transmitter 715. Wireless device 700 may also include a processor. Each of these components may be in communication with each other.

The receiver 705 may receive information such as packets, user data, or control information associated with various information channels (e.g., control channels, data channels, and information related to CRC for UCI on control and data channels, etc.). Information may be passed on to the CRC manager 710, and to other components of wireless device 700.

The CRC manager 710 may identify UCI for a CC of a CA configuration that may include a PCell and, in some aspects, a PUCCH enabled SCell, determine to include CRC information for the UCI based at least in part on a UCI characteristic or an uplink control channel format, and transmit an uplink channel including the UCI and the CRC information.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
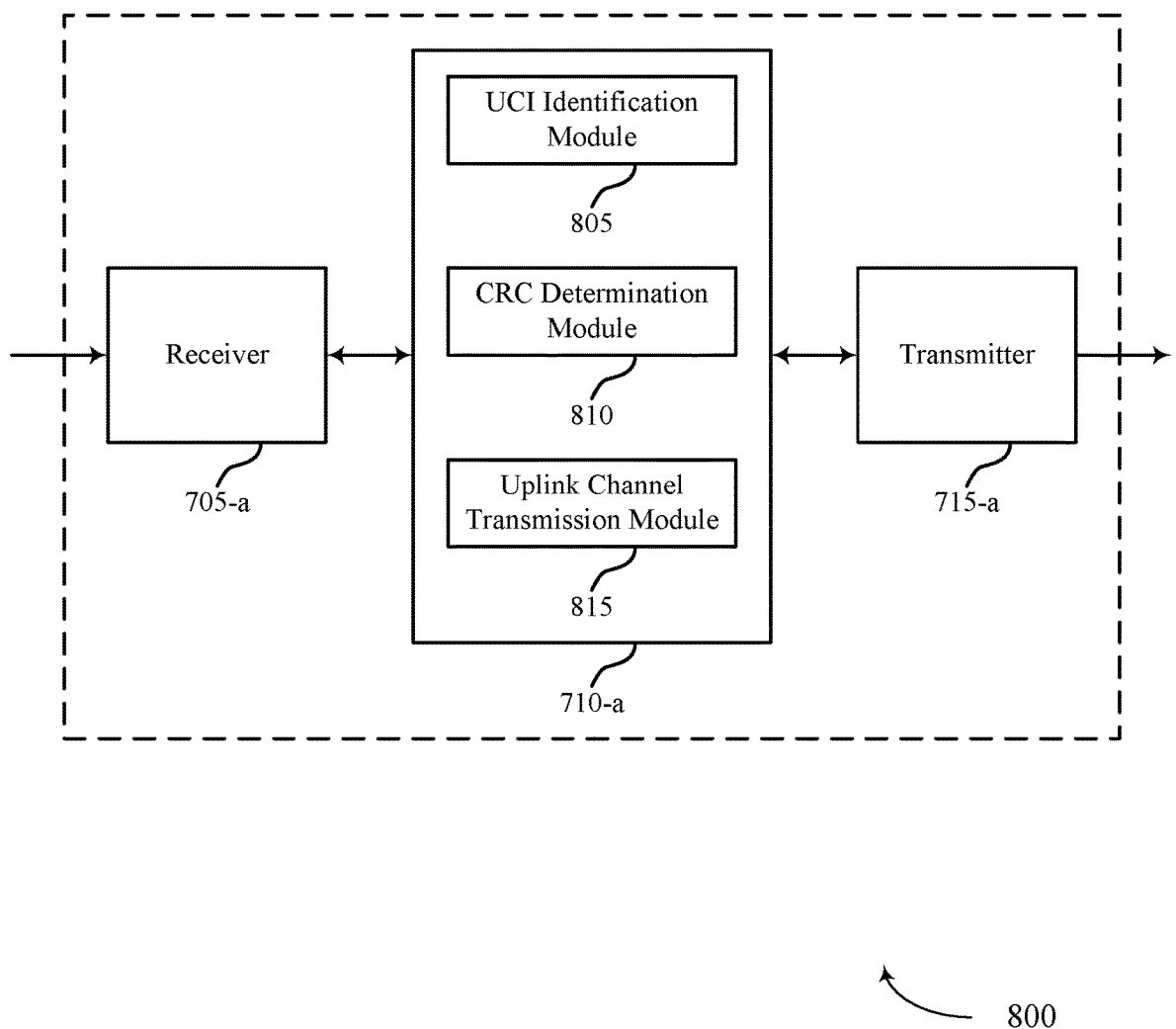

FIG. 8 shows a block diagram of a wireless device 800 to transmit a CRC for UCI on control and data channels in accordance with various aspects of the present disclosure. Wireless device 800 may be an example of aspects of a UE 115, 215, 215-a, 215-b, 215-c, 415, 415-a, 515, or 615 described with reference to FIG. 1, 2, 4, 5, or 6, or aspects of the wireless device 700 described with reference to FIG. 7. Wireless device 800 may include a receiver 705-a, a CRC manager 710-a, or a transmitter 715-a. Wireless device 800 may also include a processor. Each of these components may be in communication with each other. The CRC manager 710-a may also include a UCI identification module 805, a CRC determination module 810, and an uplink channel transmission module 815.

The receiver 705-a may receive information which may be passed on to CRC manager 710-a, and to other components of wireless device 800. The CRC manager 710-a may perform the operations described with reference to FIG. 7. The transmitter 715-a may transmit signals received from other components of wireless device 800.

The UCI identification module 805 may identify UCI for a CC of a CA configuration that may include a PCell and, in some aspects, a PUCCH enabled SCell as described, for example, with reference to FIG. 5 or 6. In some examples, identifying UCI for the CC of the CA configuration may include identifying UCI for a plurality of CCs of the CA configuration, wherein the determination to include CRC information may be based at least in part on a quantity of CCs in the plurality. In some examples, the UCI characteristic may include a UCI type. In some examples, the UCI may include a plurality of UCI types.

The CRC determination module 810 may determine to include CRC information for the UCI based at least in part on a UCI characteristic or an uplink control channel format as described, for example, with reference to FIG. 5 or 6. In some examples, the determination to include CRC information may include determining whether to include CRC information for each UCI type of the plurality. In some examples, the CRC information may include a number bits that may be based at least in part on a UCI type.

The uplink channel transmission module 815 may transmit an uplink channel including the UCI and the CRC information as described, for example, with reference to FIG. 5 or 6. In some examples, the threshold may be based at least in part on whether the uplink channel includes a PUCCH or a PUSCH. In some examples, the uplink channel may include a PUCCH or a PUSCH on the PCell. In some examples, the uplink channel may include a PUCCH or a PUSCH on the PUCCH enabled SCell. In some examples, the CA configuration may include more than five CCs.

Figure 9:
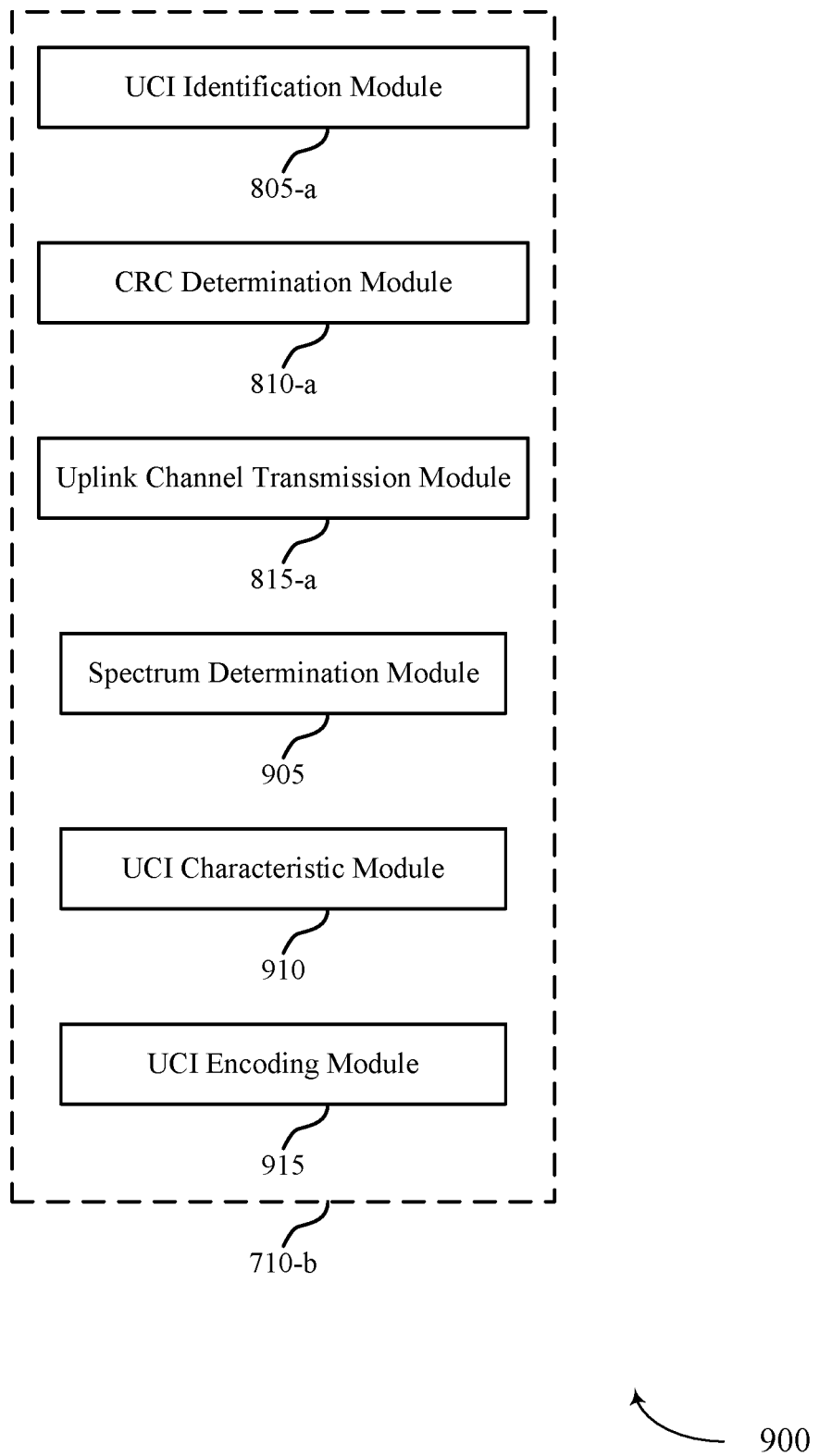

FIG. 9 shows a block diagram 900 of a CRC manager 710-b which may be a component of the wireless device 700 or the wireless device 800 in accordance with various aspects of the present disclosure. The CRC manager 710-b may be an example of aspects of the CRC manager 710 described with reference to FIG. 7 or 8. The CRC manager 710-b may include a UCI identification module 805-a, a CRC determination module 810-a, and an uplink channel transmission module 815-a. Each of these modules may perform the functions described with reference to FIG. 8. The CRC manager 710-b may also include a spectrum determination module 905, a UCI characteristic module 910, and a UCI encoding module 915.

The spectrum determination module 905 may determine that the CC includes frequency resources of unlicensed spectrum. The determination to include CRC information for the UCI may be based at least in part on the determination that the carrier includes the frequency resources of the unlicensed spectrum as described, for example, with reference to FIG. 5 or 6.

The UCI characteristic module 910 may be configured such that the UCI characteristic may include a payload size of the UCI as described, for example, with reference to FIG. 5 or 6. The UCI characteristic module 910 may also identify a payload size of the UCI. The determination to include the CRC information may be based at least in part on the payload size exceeding a threshold (e.g., a payload size threshold). In some examples, the payload size of the UCI may be identified based at least in part on at least one of an RRC configuration, dynamic signaling, or a number of transport blocks, or any combination thereof. In some examples, the plurality of UCI types may include at least one of an ACK, a NAK, a CQI, a PMI, an RI, a PTI, or any combination thereof.

The UCI encoding module 915 may select a coding scheme for the payload of the UCI. The determination to include the CRC information may be based at least in part on the coding scheme as described, for example, with reference to FIG. 5 or 6.

Figure 10:
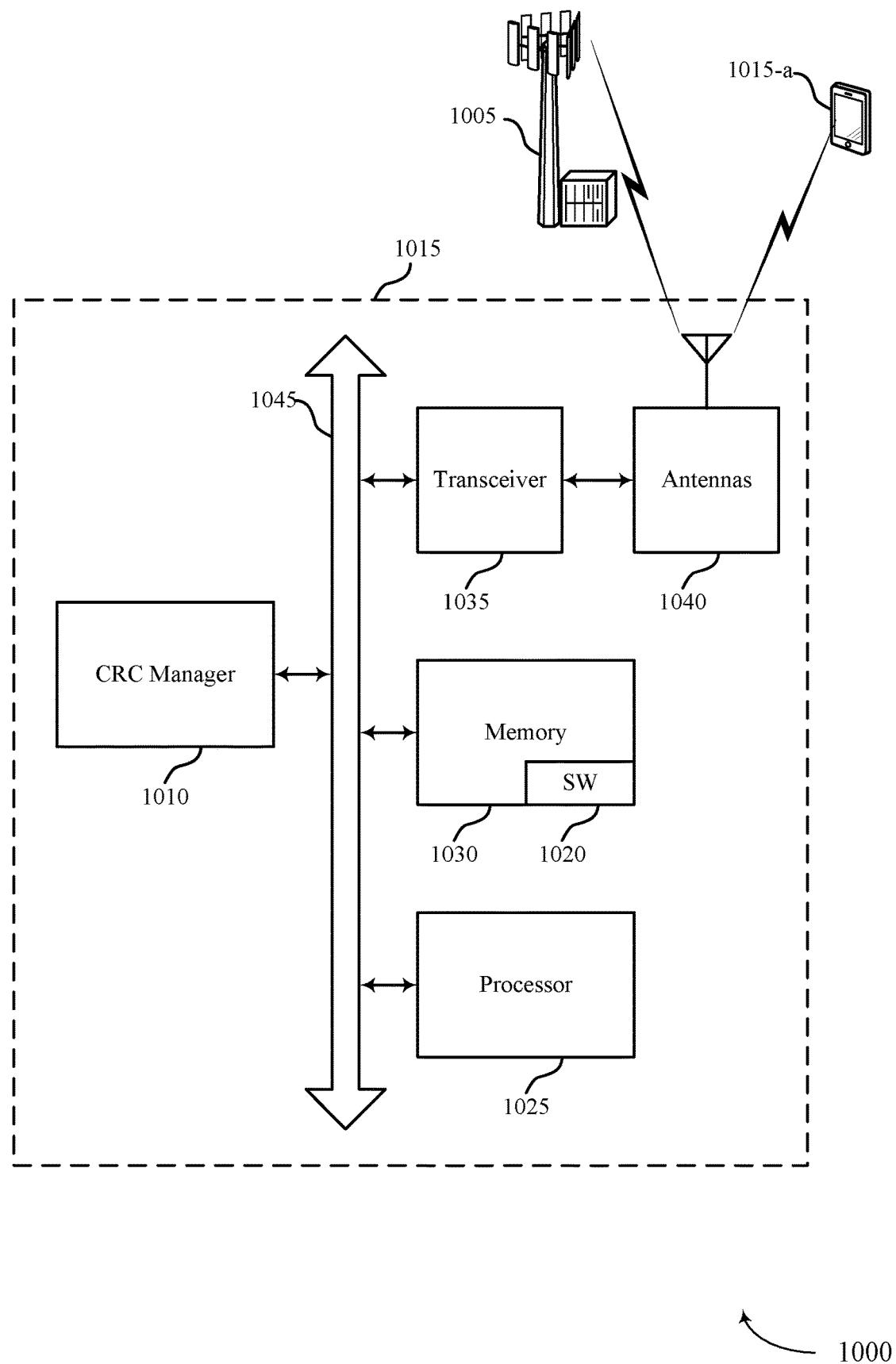
FIG. 10 illustrates a block diagram of a system including a user equipment (UE) that supports transmission of CRC for UCI on control and data channels in accordance with various aspects of the present disclosure.

FIG. 10 shows a diagram of a system 1000 including a UE 115 configured to transmit a CRC for UCI on control and data channels in accordance with various aspects of the present disclosure. System 1000 may include UE 1015, which may be an example of aspects of a UE 115, 215, 215-a, 215-b, 215-c, 415, 415-a, 515, or 615 described with reference to FIG. 1, 2 4, 5, or 6, or aspects of the wireless device 700 or wireless device 800 described with reference to FIG. 7, 8, or 9. UE 1015 may include a CRC manager 1010, which may be an example of the CRC manager 710 described with reference to FIG. 7, 8, or 9. UE 1015 may also include components for bi-directional voice and data communications including components for transmitting communications and components for receiving communications. For example, UE 1015 may communicate bi-directionally with UE 1015-a or base station 1005

UE 1015 may also include a processor 1025, and memory 1030 (including software (SW)) 1020, a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 1015 may include a single antenna 1040, UE 1015 may also have multiple antennas 1040 capable of concurrently transmitting or receiving multiple wireless transmissions.

The memory 1030 may include random access memory (RAM) and read only memory (ROM). The memory 1030 may store computer-readable, computer-executable software/firmware code 1020 including instructions that, when executed, cause the processor 1025 to perform various functions described herein (e.g., the transmission of CRC for UCI on control and data channels, etc.). Alternatively, the software/firmware code 1020 may not be directly executable by the processor 1025 but cause a computer (e.g., when compiled and executed) to perform functions described herein. The processor 1025 may include an intelligent hardware device, (e.g., a central processing unit (CPU), a microcontroller, an application specific integrated circuit (ASIC), etc.)

The components of UE 1015, wireless device 700, wireless device 800, or CRC manager 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 11:
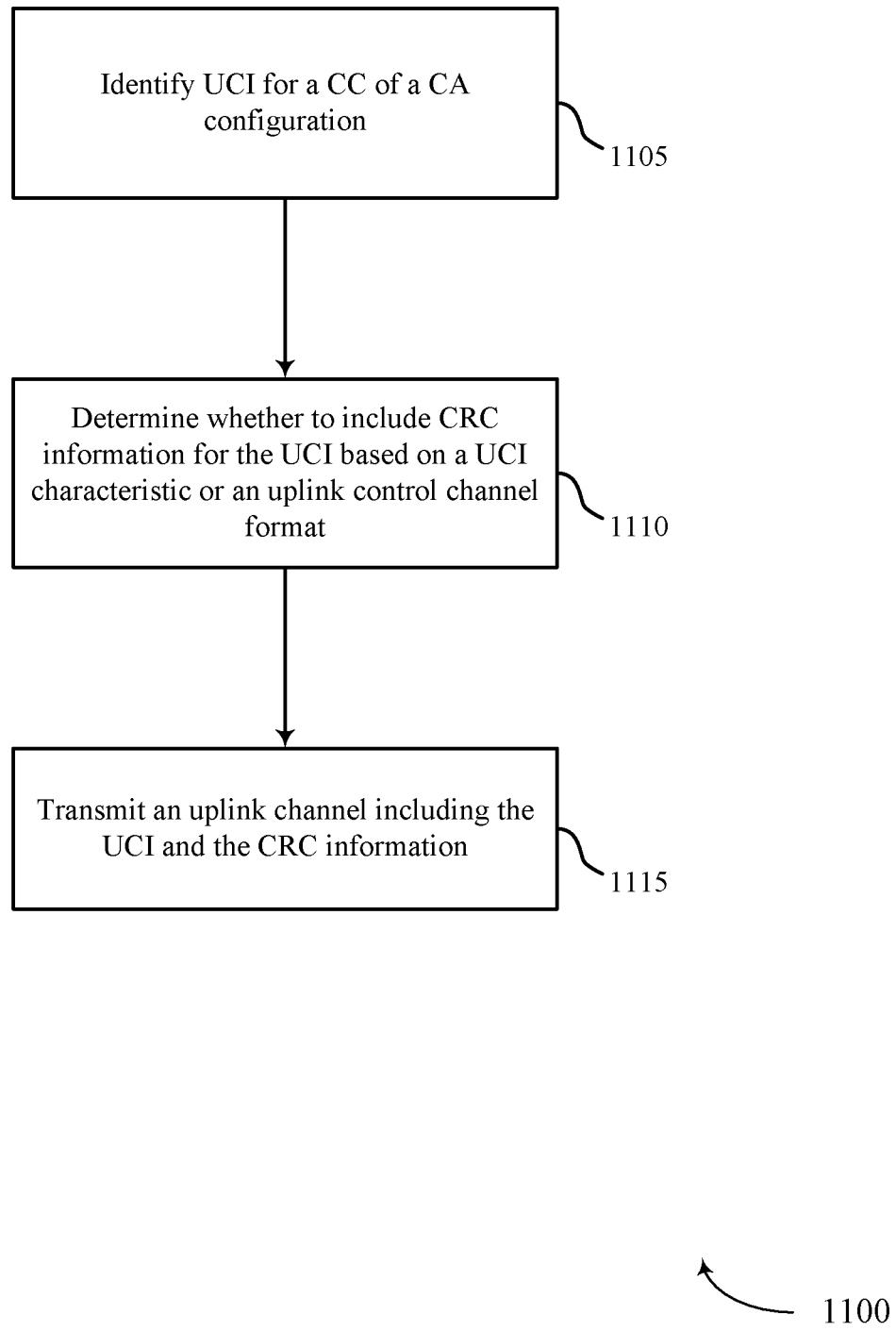
FIGS. 11-14 illustrate methods to transmit a CRC for UCI on control and data channels in accordance with various aspects of the present disclosure.

FIG. 11 shows a flowchart illustrating a method 1100 to transmit a CRC for UCI on control and data channels in accordance with various aspects of the present disclosure. The operations of method 1100 may be implemented by a UE 115, 215, 215-a, 215-b, 215-c, 415, 415-a, 515, 615, or 1015 as described with reference to FIG. 1, 2, 4, 5, 6, or 10, or a wireless device 700 or 800 or its components as described with reference to FIG. 7, 8, or 9. For example, the operations of method 1100 may be performed by the CRC manager 710 as described with reference to FIG. 7, 8, 9, or 10. In some examples, a UE may execute a set of codes to control the functional elements of the UE to perform the functions described below. Additionally or alternatively, the UE may perform aspects the functions described below using special-purpose hardware.

At block 1105, the UE 115 may identify UCI for a CC of a CA configuration as described, for example, with reference to FIG. 5 or 6. In some cases, the CA configuration may further include a PCell and/or a PUCCH enabled SCell. In certain examples, the operations of block 1105 may be performed by the UCI identification module 805 as described with reference to FIG. 8.

At block 1110, the UE 115 may determine to include CRC information for the UCI based at least in part on a UCI characteristic or an uplink control channel format as described, for example, with reference to FIG. 5 or 6. In certain examples, the operations of block 1110 may be performed by the CRC determination module 810 as described with reference to FIG. 8.

At block 1115, the UE 115 may transmit an uplink channel including the UCI and the CRC information as described, for example, with reference to FIG. 5 or 6. In certain examples, the operations of block 1115 may be performed by the uplink channel transmission module 815 as described with reference to FIG. 8.

Figure 12:
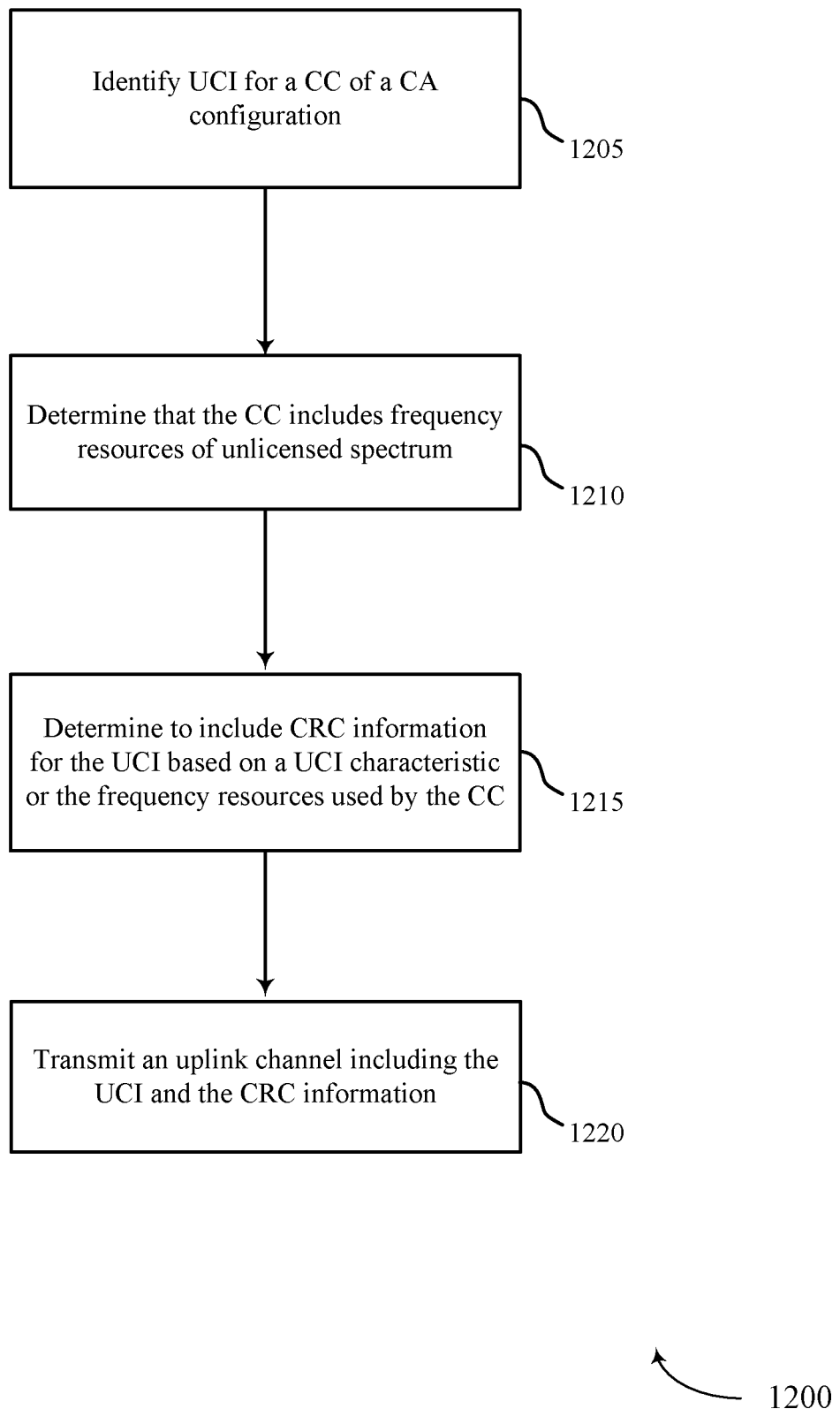

FIG. 12 shows a flowchart illustrating a method 1200 to transmit a CRC for UCI on control and data channels in accordance with various aspects of the present disclosure. The operations of method 1200 may be implemented by a UE 115, 215, 215-a, 215-b, 215-c, 415, 415-a, 515, 615, or 1015 as described with reference to FIG. 1, 2, 4, 5, 6, or 10, or a wireless device 700 or 800 or its components as described with reference to FIG. 7, 8, or 9. For example, the operations of method 1200 may be performed by the CRC manager 710 as described with reference to FIG. 7, 8, 9, or 10. In some examples, a UE may execute a set of codes to control the functional elements of the UE to perform the functions described below. Additionally or alternatively, the UE may perform aspects the functions described below using special-purpose hardware. The method 1200 may also incorporate aspects of method 1100 of FIG. 11.

At block 1205, the UE 115 may identify UCI for a CC of a CA as described, for example, with reference to FIG. 5 or 6. In certain examples, the operations of block 1205 may be performed by the UCI identification module 805 as described with reference to FIG. 8.

At block 1210, the UE 115 may determine to include CRC information for the UCI based at least in part on a UCI characteristic or an uplink control channel format as described, for example, with reference to FIG. 5 or 6. In certain examples, the operations of block 1210 may be performed by the CRC determination module 810 as described with reference to FIG. 8.

At block 1215, the UE 115 may transmit an uplink channel including the UCI and the CRC information as described, for example, with reference to FIG. 5 or 6. In certain examples, the operations of block 1215 may be performed by the uplink channel transmission module 815 as described with reference to FIG. 8.

At block 1220, the UE 115 may determine that the CC includes frequency resources of unlicensed spectrum. The determination to include CRC information for the UCI may be based at least in part on the determination that the carrier includes the frequency resources of the unlicensed spectrum as described, for example, with reference to FIG. 5 or 6. In certain examples, the operations of block 1220 may be performed by the spectrum determination module 905 as described with reference to FIG. 9.

Figure 13:
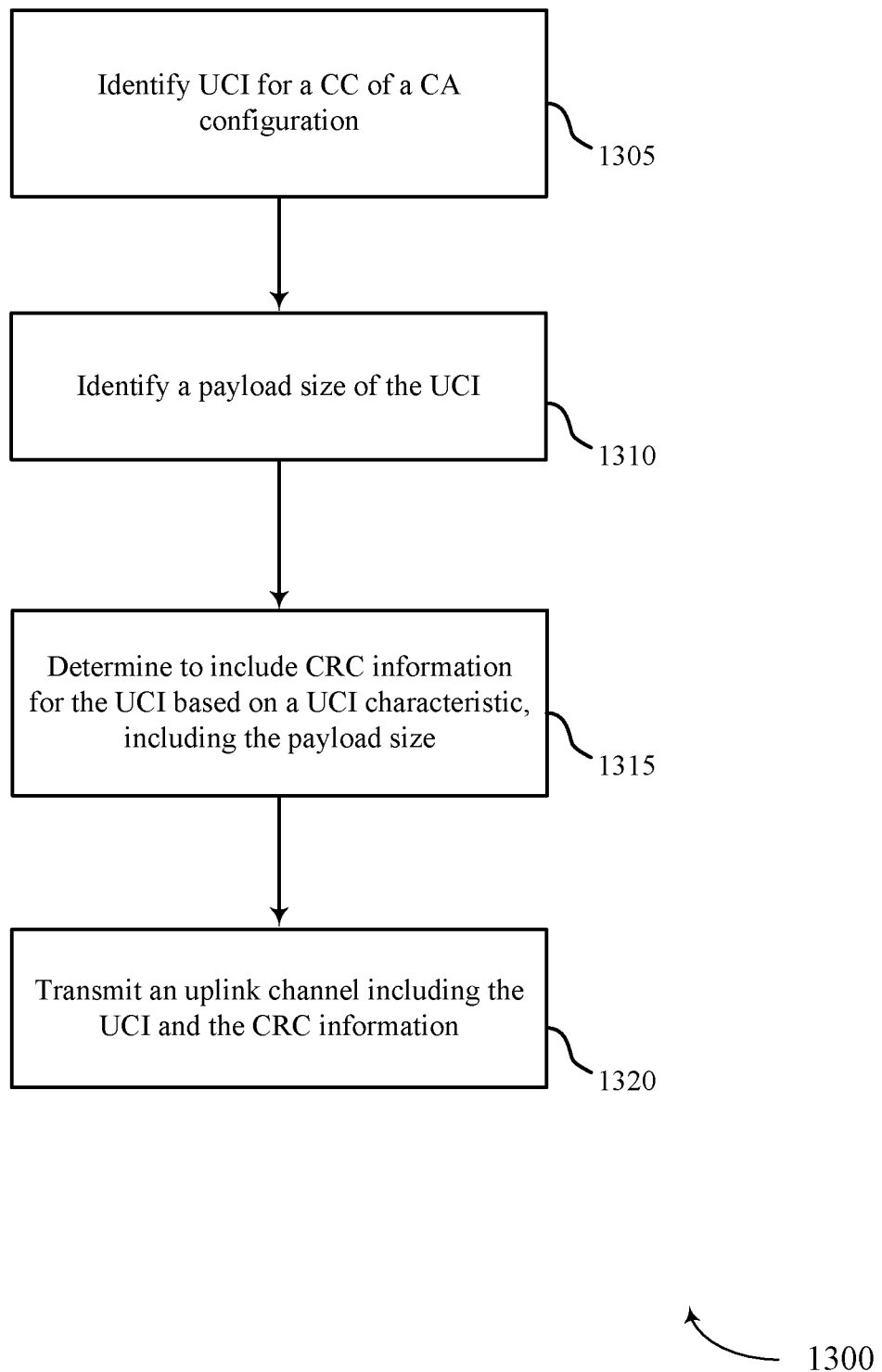

FIG. 13 shows a flowchart illustrating a method 1300 to transmit a CRC for UCI on control and data channels in accordance with various aspects of the present disclosure. The operations of method 1300 may be implemented by a UE 115, 215, 215-*a*, 215-*b*, 215-*c*, 415, 415-*a*, 515, 615, or 1015 as described with reference to FIG. 1, 2, 4, 5, 6, or 10, or a wireless device 700 or 800 or its components as described with reference to FIG. 7, 8, or 9. For example, the operations of method 1300 may be performed by the CRC manager 710 as described with reference to FIG. 7, 8, 9, or 10. In some examples, a UE may execute a set of codes to control the functional elements of the UE to perform the functions described below. Additionally or alternatively, the UE may perform aspects the functions described below using special-purpose hardware. The method 1300 may also incorporate aspects of methods 1100, and 1200 of FIGS. 11-12.

At block 1305, the UE 115 may identify UCI for a CC of a CA as described, for example, with reference to FIG. 5 or 6. In certain examples, the operations of block 1305 may be performed by the UCI identification module 805 as described with reference to FIG. 8.

At block 1310, the UE 115 may determine to include CRC information for the UCI based at least in part on a UCI characteristic or an uplink control channel format as described, for example, with reference to FIG. 5 or 6. In some cases, the UCI characteristic may include a payload size of the UCI. In certain examples, the operations of block 1310 may be performed by the CRC determination module 810 as described with reference to FIG. 8.

At block 1315, the UE 115 may transmit an uplink channel including the UCI and the CRC information as described, for example, with reference to FIG. 5 or 6. In certain examples, the operations of block 1315 may be performed by the uplink channel transmission module 815 as described with reference to FIG. 8.

At block 1320, the UE 115 may identify a payload size of the UCI. The determination to include the CRC information may be based at least in part on the payload size exceeding a threshold (e.g., a payload size threshold) as described with reference to FIG. 5 or 6. In certain examples, the operations of block 1320 may be performed by the UCI characteristic module 910 as described with reference to FIG. 9.

Figure 14:
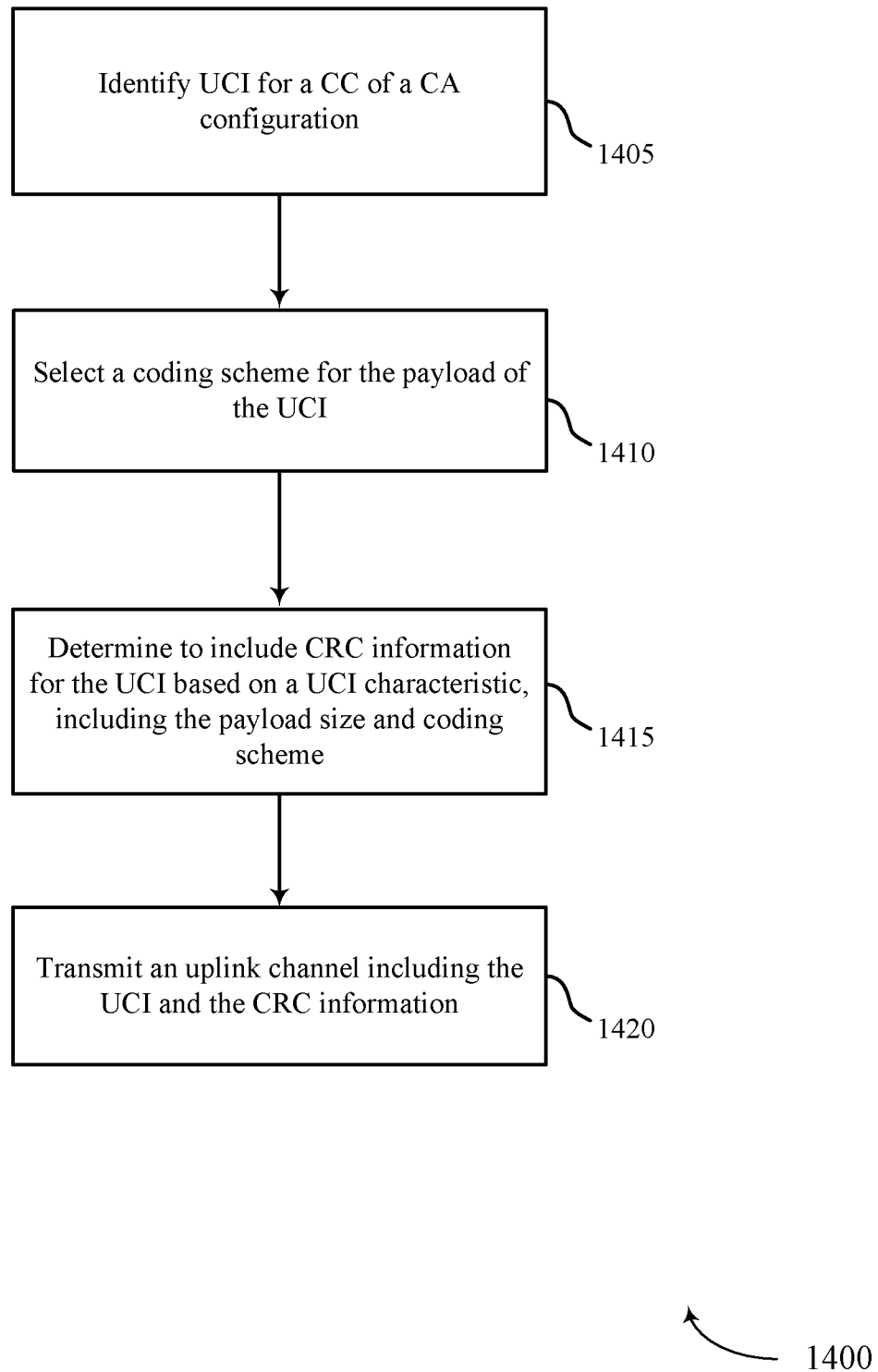

FIG. 14 shows a flowchart illustrating a method 1400 to transmit a CRC for UCI on control and data channels in accordance with various aspects of the present disclosure. The operations of method 1400 may be implemented by a UE 115, 215, 215-*a*, 215-*b*, 215-*c*, 415, 415-*a*, 515, 615, or 1015 as described with reference to FIG. 1, 2, 4, 5, 6, or 10, or a wireless device 700 or 800 or its components as described with reference to FIG. 7, 8, or 9. For example, the operations of method 1400 may be performed by the CRC manager 710 as described with reference to FIG. 7, 8, 9, or 10. In some examples, a UE may execute a set of codes to control the functional elements of the UE to perform the functions described below. Additionally or alternatively, the UE may perform aspects the functions described below using special-purpose hardware. The method 1400 may also incorporate aspects of methods 1100, 1200, and 1300 of FIGS. 11-13.

At block 1405, the UE 115 may identify UCI for a CC of a CA configuration as described, for example, with reference to FIG. 5 or 6. In certain examples, the operations of block 1405 may be performed by the UCI identification module 805 as described with reference to FIG. 8.

At block 1410, the UE 115 may determine to include CRC information for the UCI based at least in part on a UCI characteristic or an uplink control channel format as described, for example, with reference to FIG. 5 or 6. In some cases, the UCI characteristic may include a payload size of the UCI. In certain examples, the operations of block 1410 may be performed by the CRC determination module 810 as described with reference to FIG. 8.

At block 1415, the UE 115 may transmit an uplink channel including the UCI and the CRC information as described, for example, with reference to FIG. 5 or 6. In certain examples, the operations of block 1415 may be performed by the uplink channel transmission module 815 as described with reference to FIG. 8.

At block 1420, the UE 115 may select a coding scheme for the payload of the UCI. The determination to include the CRC information may be based at least in part on the coding scheme as described, for example, with reference to FIG. 5 or 6. In certain examples, the operations of block 1420 may be performed by the UCI encoding module 915 as described with reference to FIG. 9.

Thus, methods 1100, 1200, 1300, and 1400 may provide for transmitting a CRC for UCI on control and data channels. It should be noted that methods 1100, 1200, 1300, and 1400 describe possible implementation, and that the operations and the steps may be rearranged or otherwise modified such that other implementations are possible. In some examples, aspects from two or more of the methods 1100, 1200, 1300, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising: identifying uplink control information (UCI) for a plurality of component carriers (CCs) of a carrier aggregation (CA) configuration, the UCI having a payload size of a first number of bits; identifying, for the UCI, a UCI type from a set of UCI types or an uplink control channel format from a set of uplink control channel formats, wherein the set of UCI types comprises at least a first UCI type and a second UCI type, and the set of uplink control channel formats comprises at least a first uplink control channel format and a second uplink control channel format; determining a threshold payload size from a set of threshold payload sizes based at least in part on the UCI type or the uplink control channel format of the UCI, the threshold payload size indicating a second number of bits, wherein the set of threshold payload sizes comprises at least a first threshold payload size for the first UCI type or the first uplink control channel format and a second threshold payload size for the second UCI type or the second uplink control channel format, and wherein the first threshold payload size for the first UCI type or the first uplink control channel format is different from the second threshold payload size for the second UCI type or the second uplink control channel format; determining whether to include cyclic redundancy check (CRC) information in a transmission of the UCI based at least in part on a comparison of the first number of bits of the payload size to the second number of bits of the threshold payload size; and transmitting the transmission of the UCI according to the determination of whether to include the CRC information.

2. The method of claim 1, wherein the CA configuration further comprises a primary cell (PCell) and a physical uplink control channel (PUCCH) enabled secondary cell (SCell).

3. The method of claim 2, wherein the determining whether to include CRC information is performed separately for at least a first group and a second group, wherein the first group comprises the PCell and the second group comprises the PUCCH enabled SCell.

4. The method of claim 1, further comprising: determining that the plurality of CCs comprise frequency resources of unlicensed spectrum, wherein the determining whether to include the CRC information is based at least in part on the determining that the plurality of CCs comprise the frequency resources of the unlicensed spectrum.

5. The method of claim 1, wherein the threshold payload size is based at least in part on whether the uplink channel comprises a physical uplink control channel (PUCCH) or a physical uplink shared channel (PUSCH).

6. The method of claim 1, wherein the payload size of the UCI is identified based at least in part on at least one of a radio resource control (RRC) configuration, dynamic signaling, or a number of transport blocks, or any combination thereof.

7. The method of claim 1, further comprising: selecting a coding scheme for a payload of the payload size of the UCI, wherein the determining whether to include the CRC information is associated with the coding scheme.

8. The method of claim 1, wherein the determining whether to include CRC information is based at least in part on a quantity of CCs in the plurality of CCs.

9. The method of claim 1, wherein the UCI comprises a plurality of UCI types; and wherein the determining whether to include the CRC information comprises: determining whether to include the CRC information separately for one or more UCI types of the plurality of UCI types.

10. The method of claim 1, wherein the plurality of UCI types comprises at least one of an acknowledgement (ACK), a negative ACK (NAK), a channel quality indicator (CQI), a precoding matrix indicator (PMI), a rank indicator (RI), a procedure transaction identifier (PTI), a scheduling request (SR), or any combination thereof.

11. The method of claim 1, wherein the CRC information comprises a number of bits that is based at least in part on the UCI type.

12. The method of claim 1, wherein the uplink control channel format comprises a physical uplink control channel (PUCCH) on a primary cell (PCell).

13. The method of claim 1, wherein the uplink control channel format comprises a physical uplink control channel (PUCCH) on a PUCCH enabled secondary cell (SCell).

14. The method of claim 1, wherein the uplink control channel format comprises a physical uplink shared channel (PUSCH).

15. The method of claim 1, wherein the CA configuration comprises more than five CCs.

16. An apparatus for wireless communication, comprising: means for identifying uplink control information (UCI) for a plurality of component carriers (CCs) of a carrier aggregation (CA) configuration, the UCI having a payload size of a first number of bits; means for identifying, for the UC, a UCI type from a set of UCI types or an uplink control channel format from a set of uplink control channel per JS formats, wherein the set of UCI types comprises at least a first UCI type and a second UCI type, and the set of uplink control channel formats comprises at least a first uplink control channel format and a second uplink control channel format; means for determining a threshold payload size from a set of threshold payload sizes based at least in part on the UCI type or the uplink control channel format of the UCI, the threshold payload size indicating a second number of bits, wherein, the set of threshold payload sizes comprises at least a first threshold payload size for the first UCI type or the first uplink control channel format and a second threshold payload size for the second UCI type or the second uplink control channel format, and wherein the first threshold payload size for the first UCI type or the first uplink control channel format is different from the second threshold payload size for the second UCI type or the second uplink control channel format; means for determining whether to include cyclic redundancy check (CRC) information in a transmission of the UCI based at least in part on a comparison of the first number of bits of the payload size to the second number of bits of the threshold payload size; and means for transmitting the transmission of the UCI according to the determination of whether to include the CRC information.

17. The apparatus of claim 16, further comprising: means for determining that the plurality of CCs comprise frequency resources of unlicensed spectrum, wherein the determining whether to include the CRC information is based at least in part on the determining that the plurality of CCs comprise the frequency resources of the unlicensed spectrum.

18. The apparatus of claim 16, wherein the UCI comprises a plurality of UCI types, and wherein the means for determining whether to include the CRC information comprises: means for determining whether to include the CRC information separately for one or more UCI types of the plurality of UCI types.

19. An apparatus for wireless communication, comprising: a processor; memory in electronic communication with the processor; and instructions stored in the memory and operable, when executed by the processor, to cause the apparatus to: identify uplink control information (UCI) for a plurality of component carriers (CCs) of a carrier aggregation (CA) configuration, the UCI having a payload size of a first number of bits; identify, for the UCI, a UCI type from a set of UCI types or an uplink control channel format from a set of uplink control channel formats, wherein the set of UCI types comprises at least a first UCI type and a second UCI type, and the set of uplink control channel formats comprises at least a first uplink control channel format and a second uplink control channel format; determine a threshold payload size from a set of threshold payload sizes based at least in part on the UCI type or the uplink control channel format of the UCI, the threshold payload size indicating a second number of bits, wherein, the set of threshold payload sizes comprises at least a first threshold payload size for the first UCI type or the first uplink control channel format and a second threshold payload size for the second UCI type or the second uplink control channel format, and wherein the first threshold payload size for the first UCI type or the first uplink control channel format is different from the second threshold payload size for the second UCI type or the second uplink control channel format; determine whether to include cyclic redundancy check (CRC) information in a transmission of the UCI based at least in part on a comparison of the first number of bits of the payload size to the second number of bits of the threshold payload size; and transmit the transmission of the UCI according to the determination of whether to include the CRC information.

20. The apparatus of claim 19, wherein the CA configuration further comprises a primary cell (PCell) and a physical uplink control channel (PUCCH) enabled secondary cell (SCell).

21. The apparatus of claim 19, wherein the instructions are operable to cause the processor to: determine that the plurality of CCs comprise frequency resources of unlicensed spectrum, wherein the determining whether to include the CRC information is based at least in part on the determining that the plurality of CCs comprise the frequency resources of the unlicensed spectrum.

22. The apparatus of claim 19, wherein the instructions are operable to cause the processor to: select a coding scheme for a payload of the payload size of the UCI, wherein the determining whether to include the CRC information is associated with the coding scheme.

23. The apparatus of claim 19, wherein the determining to include the CRC information is based at least in part on a quantity of CCs in the plurality of CCs.

24. The apparatus of claim 19, wherein the UCI comprises a plurality of UCI types, and wherein the instructions are operable to cause the processor to: determine whether to include the CRC information separately for one or more UCI types of the plurality of UCI types.

25. A computer program product comprising a non-transitory computer-readable medium, the non-transitory computer-readable medium comprising: instructions to identify uplink control information (UCI) for a plurality of component carriers (CCs) of a carrier aggregation (CA) configuration, the UCI having a payload size of a first number of bits; instructions to identify, for the UCI, a UCI type from a set of UCI types or an uplink control channel format from a set of uplink control channel formats, wherein the set of UCI types comprises at least a first UCI type and a second UCI type, and the set of uplink control channel formats comprises at least a first uplink control channel format and a second uplink control channel format; instructions to identify determine a threshold payload size from a set of threshold payload sizes based at least in part on the UCI type or the uplink control channel format of the UCI, the threshold payload size indicating a second number of bits, wherein the UCI type is one of a first UCI type or a second UCI type, and a the set of threshold payload sizes comprises at least a first threshold payload size for the first UCI type or the first uplink control channel format and a second threshold payload size for the second UCI type or the second uplink control channel format, and wherein the first threshold payload size for the first UCI type or the first uplink control channel format is different from the second threshold payload size for the second UCI type or the second uplink control channel format; instructions to determine whether to include cyclic redundancy check (CRC) information in a transmission of the UCI based at least in part on a comparison of the first number of bits of the payload size to the second number of bits of the threshold payload size; and instructions to transmit the transmission of the UCI according to the determination of whether to include the CRC information.

* * * * *